United States Patent
Kiyokawa et al.

(10) Patent No.: US 7,538,768 B2
(45) Date of Patent: May 26, 2009

(54) IMAGE DISPLAY DEVICE UTILIZING 3D PROTECTING PROCESS BY DETECTING A PARALLAX VALUE

(75) Inventors: Izuru Kiyokawa, Machida (JP); Naoya Sugimoto, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/480,495

(22) PCT Filed: Mar. 15, 2002

(86) PCT No.: PCT/JP02/02511

§ 371 (c)(1),
(2), (4) Date: May 27, 2004

(87) PCT Pub. No.: WO03/055234

PCT Pub. Date: Jul. 3, 2003

(65) Prior Publication Data

US 2004/0239685 A1 Dec. 2, 2004

(30) Foreign Application Priority Data

Dec. 20, 2001 (JP) .............................. 2001-387842

(51) Int. Cl.
*G06T 15/20* (2006.01)
*G03B 35/00* (2006.01)
(52) U.S. Cl. ........................ 345/427; 345/418; 382/154; 352/57
(58) Field of Classification Search ........................ None
See application file for complete search history.

(56) References Cited

U.S. PATENT DOCUMENTS

| | | | |
|---|---|---|---|
| 6,417,880 B1 * | 7/2002 | Uomori et al. | 348/42 |
| 6,445,363 B1 * | 9/2002 | Urisaka | 345/7 |
| 6,549,650 B1 * | 4/2003 | Ishikawa et al. | 382/154 |

FOREIGN PATENT DOCUMENTS

| | | | |
|---|---|---|---|
| EP | 0963 122 A2 * | 12/1999 | |
| JP | 9252478 | * | 9/1997 |
| JP | 10-221637 A | | 8/1998 |
| JP | 11-355808 A | | 12/1999 |

* cited by examiner

*Primary Examiner*—Ulka Chauhan
*Assistant Examiner*—Daniel F Hajnik
(74) *Attorney, Agent, or Firm*—Frishauf, Holtz, Goodman & Chick, P.C.; Robert P. Michal

(57) ABSTRACT

An image display device capable of displaying an images on right and left image display elements (26I, and 26R) by receiving right and left image signals for displaying three-dimensional images which are fed alternately in a field sequence manner. The degree of influence on the viewer is operated by measuring the parallax value of the right and left image signals fed to the right and left image display elements (26L, and 26R) by a 3D protecting means (14), and it is judged whether or not the operated degree of influence reaches a reference value. If the operated degree of influence reaches the reference value, the degree of influence of the 3D image on the viewer is reduced by selectively displaying the result of the judgment on the right and left image display elements (26L, and 26R), so that the image can be viewed in a consistently suitable manner.

4 Claims, 17 Drawing Sheets

```
The accumulation of the degree
of influence has increased.
Is appreciation continued
as it is ?

⇨  continues.
            doesn't continues.
```

```
The image is continued by 2D.
```

| The accumulation of the degree of influence has increased.<br><br>Discontinue using for eyes and physical fitness and take a rest.<br><br>The power supply will cut in another minute. |  | Discontinue using and take a rest.<br><br>The power supply will cut soon. |

FIG. 10a
The accumulation of the degree of influence has increased.
Is appreciation continued as it is ?
⇒ continues.
doesn't continues.
FIG. 10b
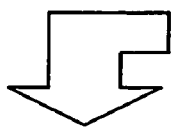
The image is continued by 2D.
FIG. 10c
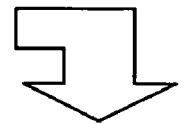
Take a rest.
The power supply will cut soon.

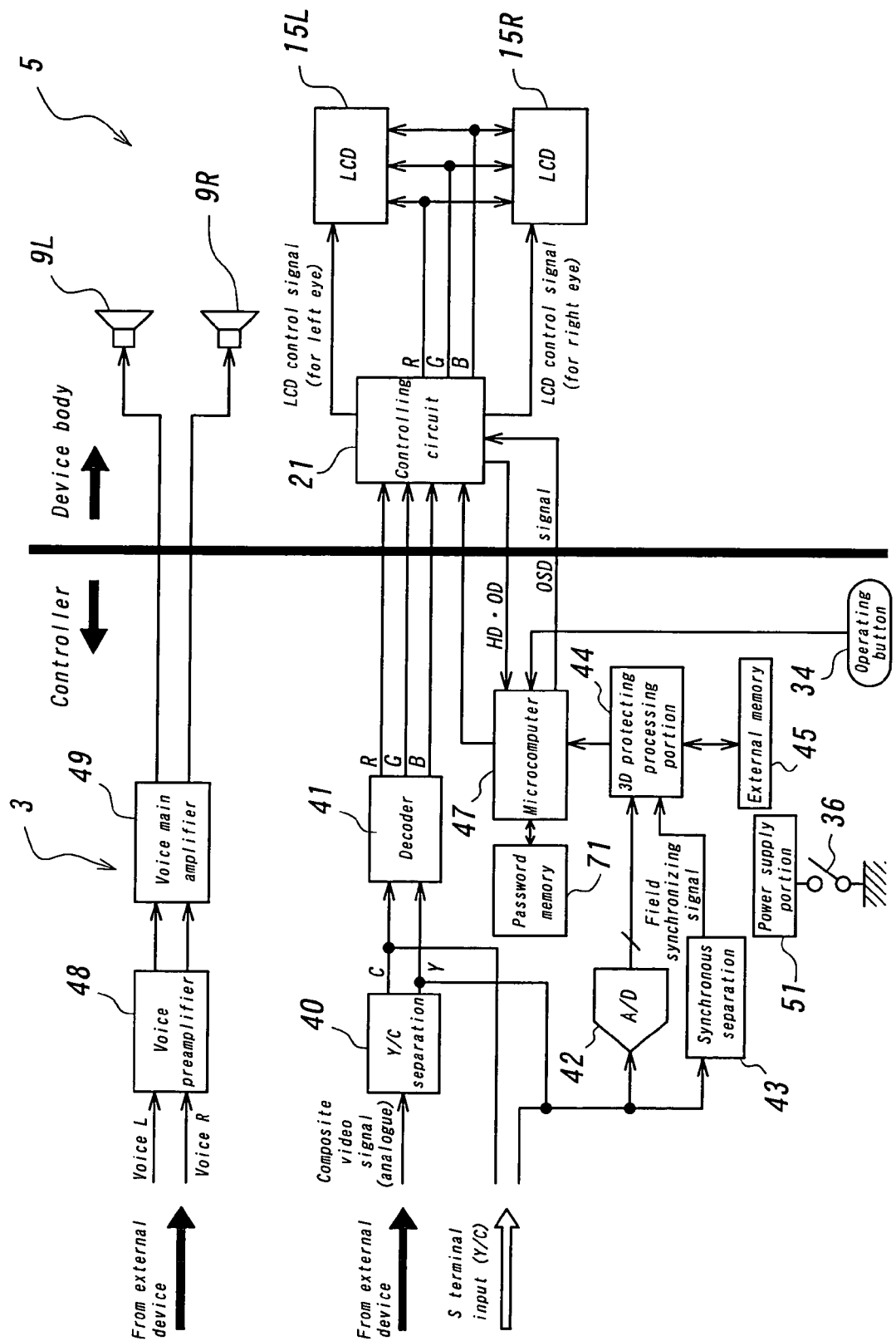

Left image        Right image

IMAGE DISPLAY DEVICE UTILIZING 3D PROTECTING PROCESS BY DETECTING A PARALLAX VALUE

This application is a U.S. National Phase Application under 35 USC 371 of International Application PCT/JP02/02511 filed Mar. 15, 2002.

TECHNICAL FIELD

The present invention relates to an image display device capable of displaying three-dimensional image (3D image).

BACKGROUND TECHNOLOGY

The image display device for displaying 3D image is variously proposed hitherto, however, 3D image displayed by such image display device has a case where hard to see and unnatural are felt, since an observation different from daily life is produced. In the contents that contain a lot of rapid parallax changes to which the parallax is large, and subject dashes out from the screen particularly, it becomes harder to see while a strong stereo effect is obtained, so that it is necessary to avoid audience for a long time.

In consideration of the respect, for example, in Japanese Patent Application Opened No. 134,587/1989, the parallax value of inputted 3D image signal is measured, and the degree of influence, that will be given to the viewer based on the parallax value, is guessed, thereby suppressing and controlling stereo degree of the 3D image displayed on the viewer, or, 3D image is controlled by the switching to two-dimensional image (2D image), thereby proposing the imaging system so constituted that the long time audience of the image with large degree of influence to emphasize the stereo effect is avoided.

On the one hand, it is known that 3D image is provided in such a manner that the image distinguishes left (L) and right (R) information based on 3D information superimposed on the vertical blanking period of the luminance signal, as defined by EIAJ CPR-1204, the left signal is displayed on the display at left side, and the right signal is displayed on the display at right side.

However, in the imaging system disclosed in Japanese Patent Application Opened No. 355,804/1989, the parallax value of only 3D video signal is measured, and the degree of influence is guessed, so that the system might not function to a rapid change in the parallax, the error at the measuring, and the noise of the image well, and it is likely to be switched to two-dimensional image compulsorily against the hope for the viewer.

On the other hand, there is a method defined by the above EIAJ as how to provide 3D image, but in the software of current 3D image in domestic and foreign countries, there are exist the method that the signal on L side is arranged in the even field, and the signal on R side is arranged in the odd field, and on the contrary, the method that the signal on R side is arranged in the even field, and the signal on L side is arranged in the odd field, together.

Therefore, in the image display device that switches L and R according to the software of the provided 3D image by hand and displays the image, there is a case where the inconvenience is generated, such as that the degree of influence to the viewer is made stronger by a wrong switch, or, the 3D image cannot be appreciated according to the provided 3D image software, or the like.

DISCLOSURE OF INVENTION

Therefore the object of the present invention performed considering this respect is to provide an image display device capable of decreasing the degree of influence on the viewer of 3D image and of observing the image under always appropriate conditions.

The construction of the summary of the present invention is as shown in the followings 1-6.

1. An image display device capable of displaying images on right and left image display elements by receiving right and left image signals for displaying three-dimensional images which are fed alternately in a field sequential manner, comprising a 3D protecting process means for judging whether or not the operated degree of influence reached a reference value, by detecting the parallax value of the right and left video signals supplied to the right and left image display elements to operate the degree of influence on the viewer, and a display control means for selectively displaying such judgment on the right and left image display elements, in case of judging that the degree of influence reached the reference value by the 3D protecting process means.

2. An image display device in the above 1, wherein in case of displaying that the degree of influence reaches the reference value, the display control means displays whether or not the image together with the displaying are continuously appreciated, on the right and left image display elements, selectively.

3. An image display device in the above 2, wherein the display control means supplies the video signal of the odd number field or of the even number field to the above right and left image display elements, thereby two-dimensional displaying the image compulsorily, in case of selecting that the image is appreciated continuously, and the display control means turns off the main power supply compulsorily, in case of selecting that the image is not appreciated continuously.

4. An image display device in the above 1, 2 or 3, further comprising a password input means for inputting a password of a viewer selectively, a password storage means for storing the password from the password input means selectively, a password decision means for deciding whether the password from the password input means is stored in the password storage means, and in case of being decided by the password decision means that the password is stored, even if it is decided that the above degree of influence reached the above reference value in the above 3D protecting process means, without displaying the decision on the right and left image display elements, the display control means displays the three-dimensional image on the right and left image display elements, and then in case of being decided that the password is not stored by the password decision means, if it is decided that the above degree of influence reached the above reference value in the above 3D protecting process means the display control means displays the decision on the right and left image display elements.

5. An image display device in any one of the above 1-4, further comprising a field distinction means for distinguishing the field of a right and left video signal based on the parallax value detected by the 3D protecting process means, and the display control means a left video signal is supplied to a left image displaying element, and a right video signal is supplied to a right image displaying element, respectively, according to a result of the distinction in the field distinction means.

6. An image display device in the above 5, wherein during distinction period of the field due to the field distinction means, the display control means prohibits the display of the three-dimensional image on the right and left image display elements, and displays the duration of the distinction period of the field on these right and left image display elements.

BRIEF EXPLANATION OF DRAWING

FIGS. 10a to 10c are views showing the OSD display embodiment for explaining the second embodiment of the present invention;

FIG. 11 is a block diagram showing the circuit structure of the principal portion in the third embodiment of the present invention;

BEST MODE FOR CARRYING-OUT OF THE INVENTION

FIRST EMBODIMENT

Figure 1:
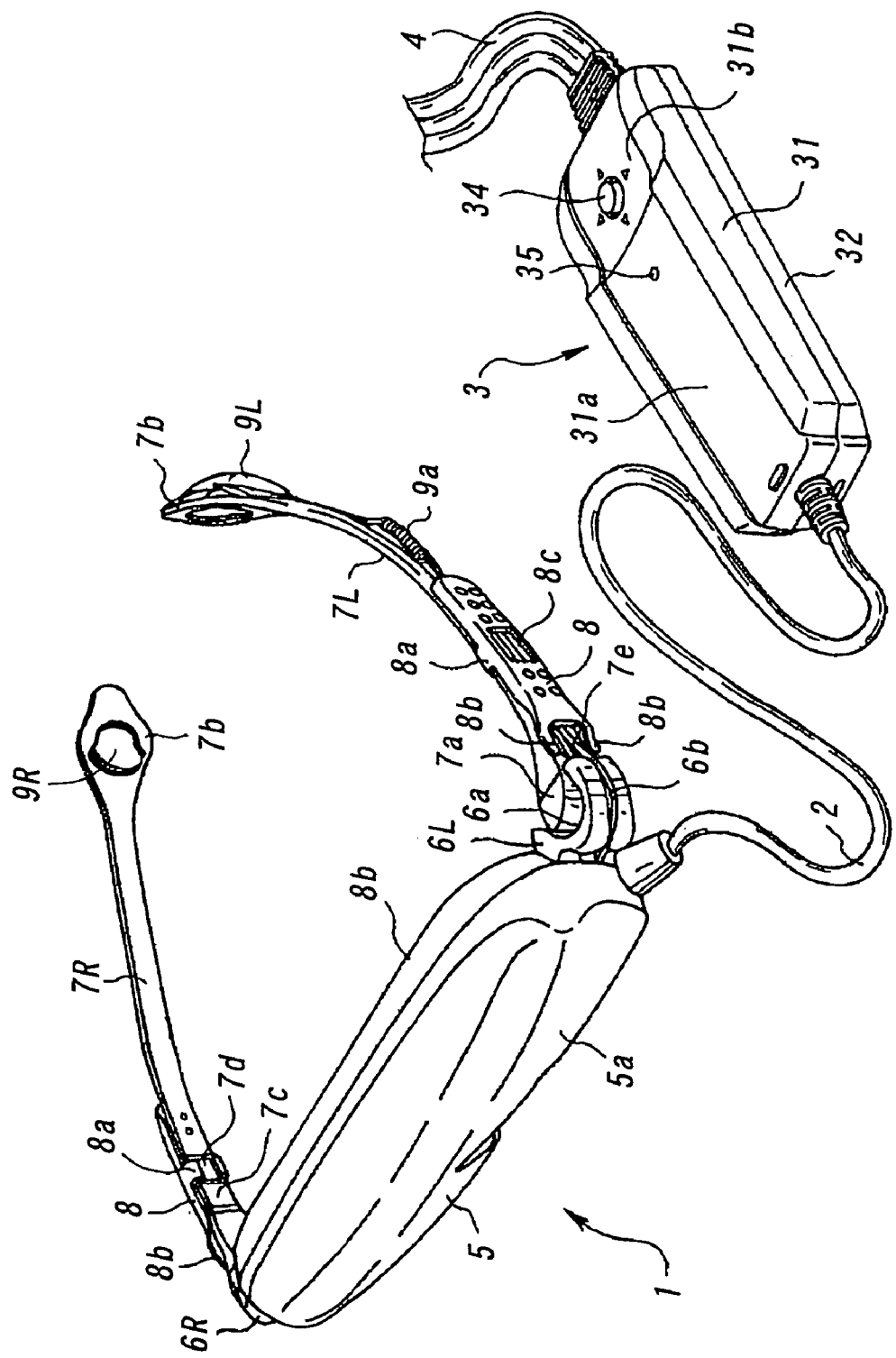
FIG. 1 is a perspective view showing the head mounted type image display device and the controller in the first embodiment of the present invention.
Figure 2:
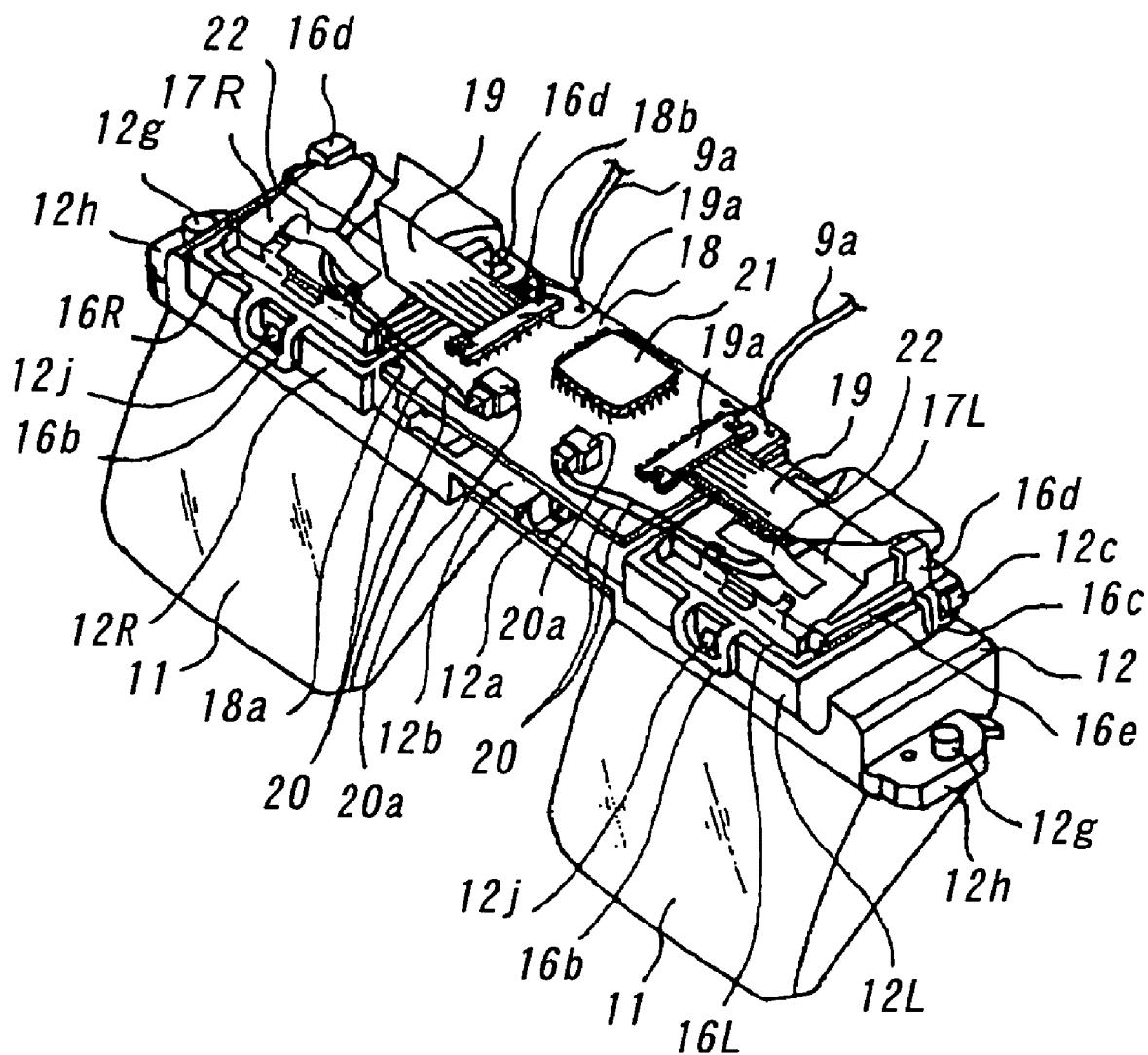
FIG. 2 is a perspective view showing the appearance in which the image displaying system of the head mounted type image display device shown in FIG. 1 is assembled.
Figure 3:
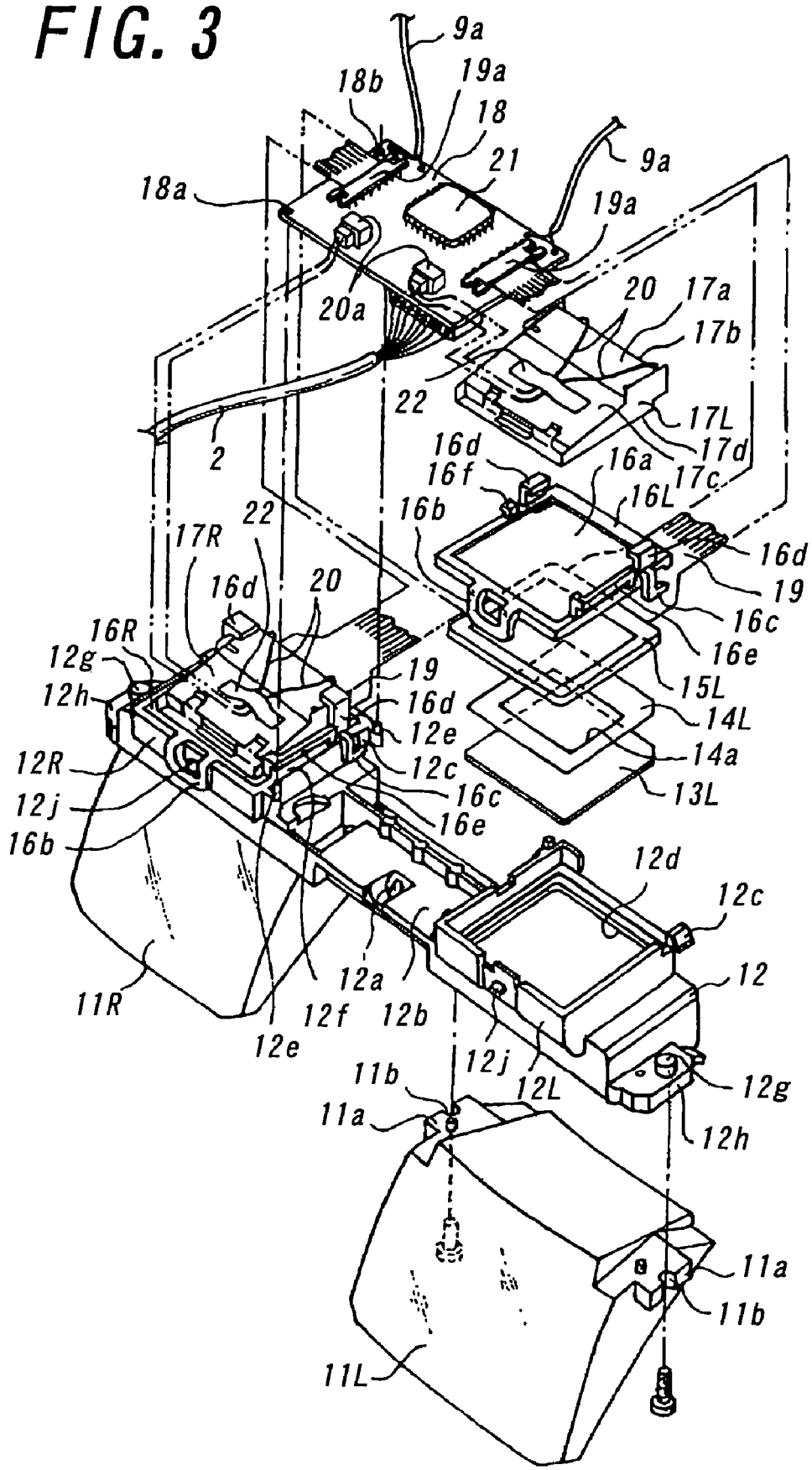
FIG. 3 is a partially exploded perspective view of the image displaying system shown in FIG. 2.
Figure 4:
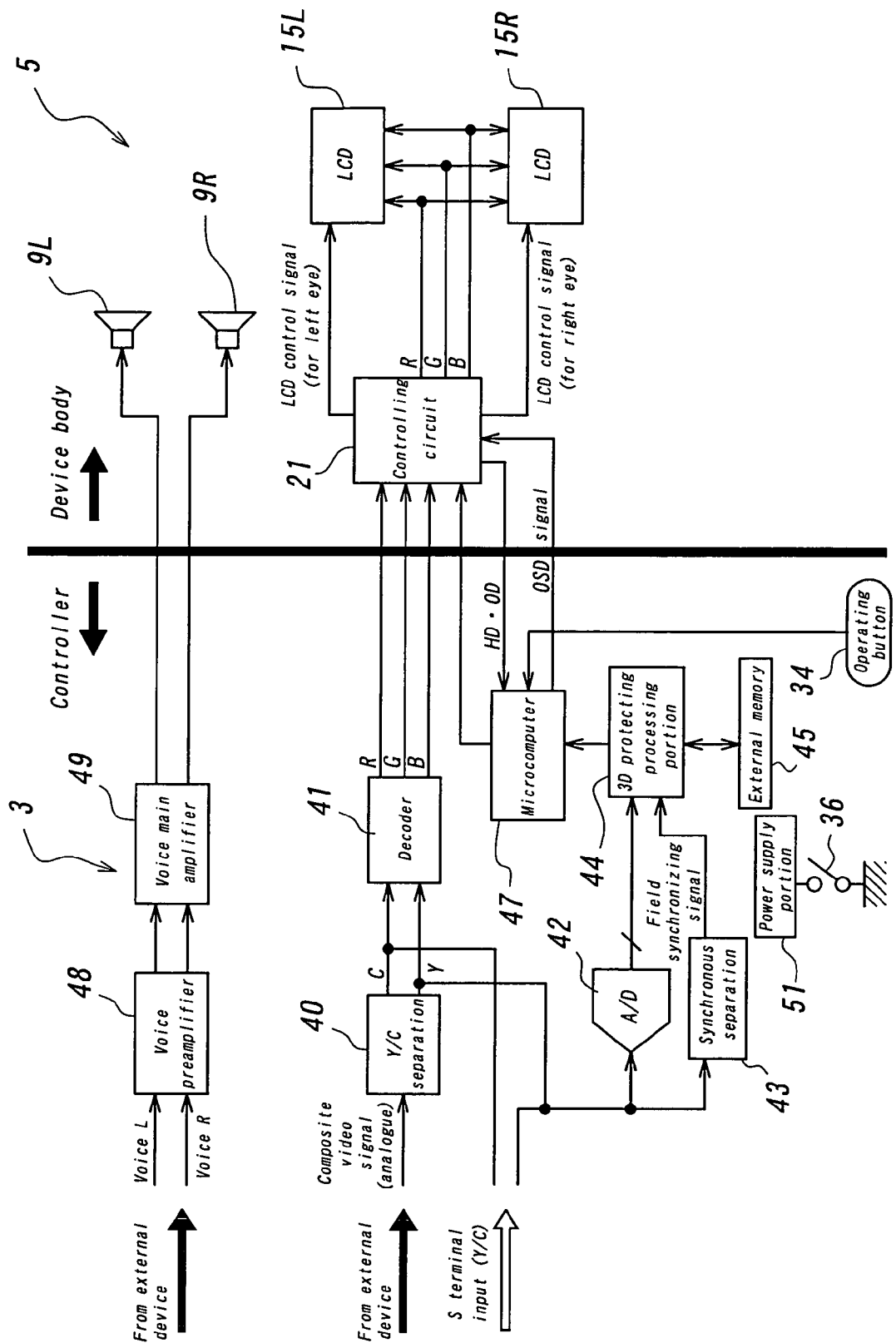
FIG. 4 is a block diagram showing the circuit structure of the principal portion in the first embodiment of the present invention.
Figure 5:
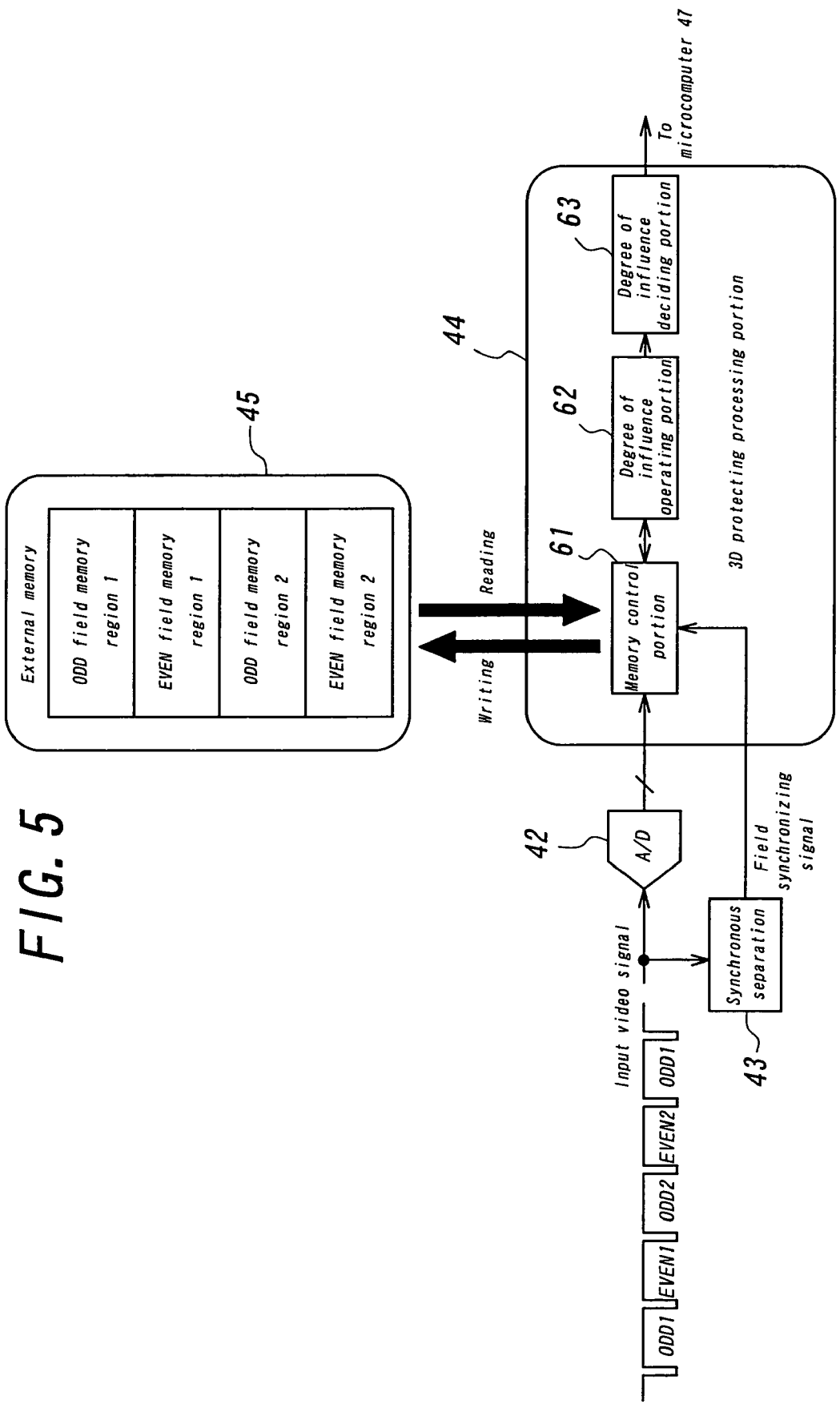
FIG. 5 is a block diagram showing the constitution of one embodiment of the 3D protect processing portion shown in FIG. 4.
Figure 6:
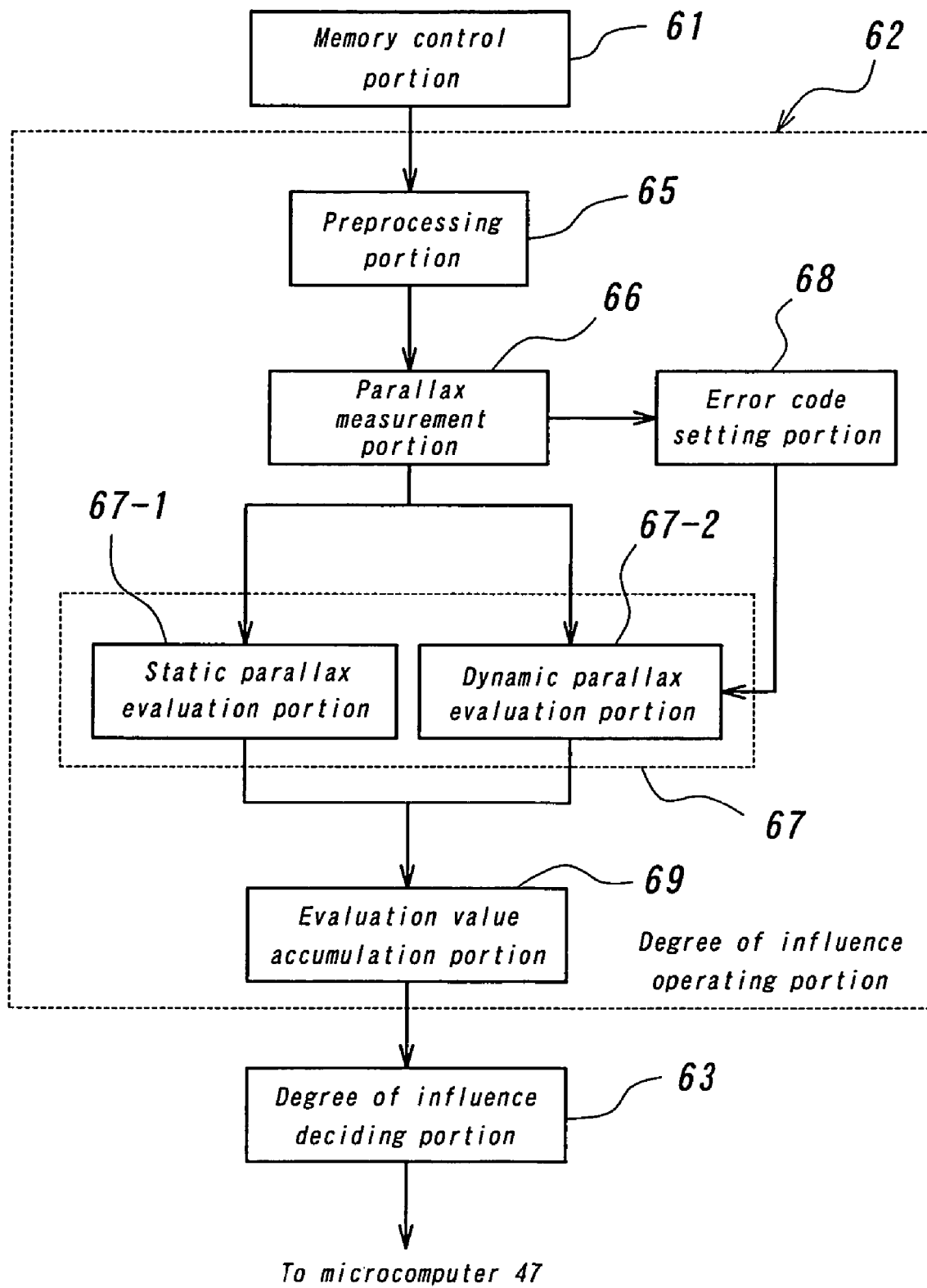
FIG. 6 is a block diagram showing the constitution of one embodiment of the degree of influence operating portion shown in FIG. 5.
Figure 7:
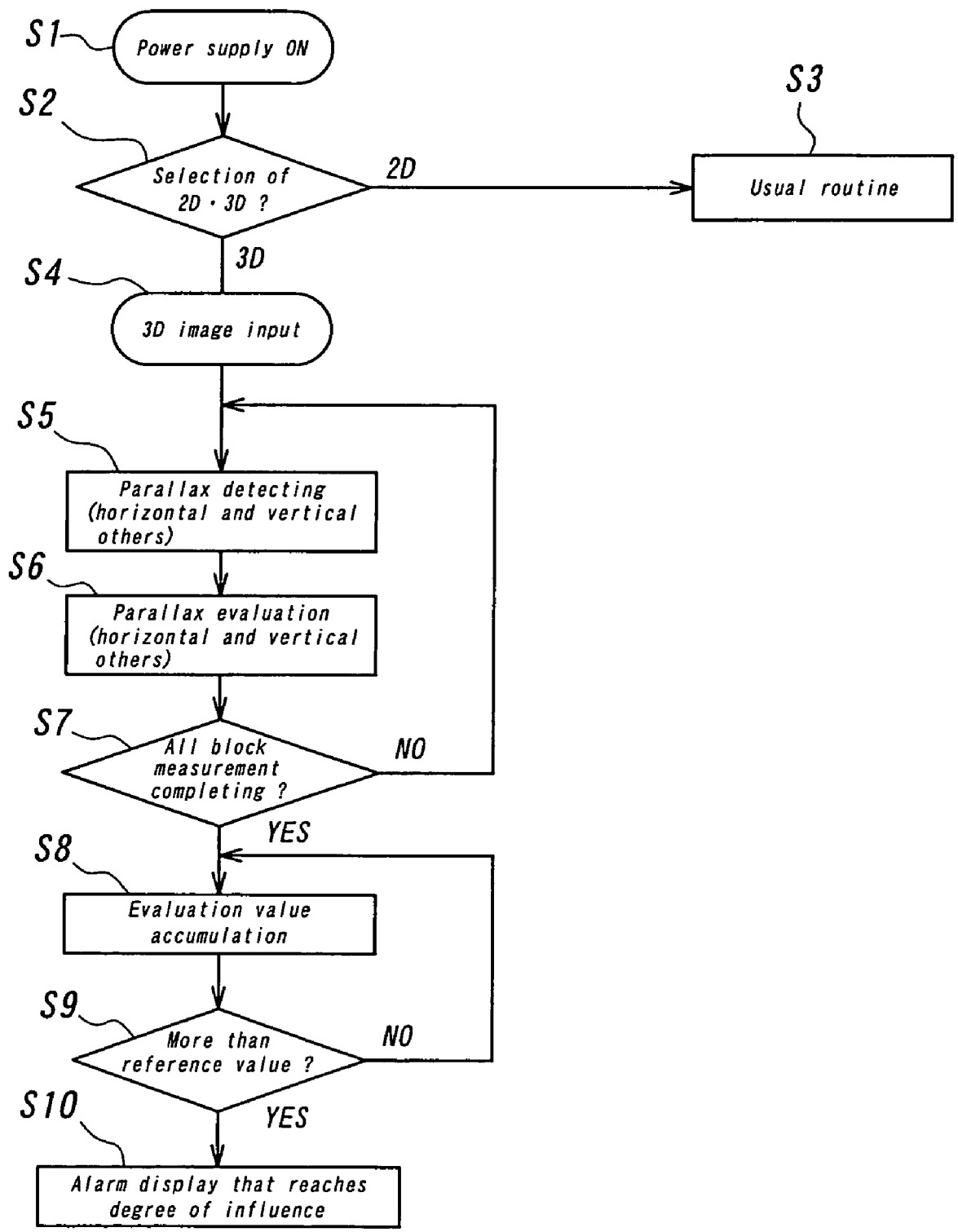
FIG. 7 is a flow chart for explaining the operation of the first embodiment.
Figure 8:
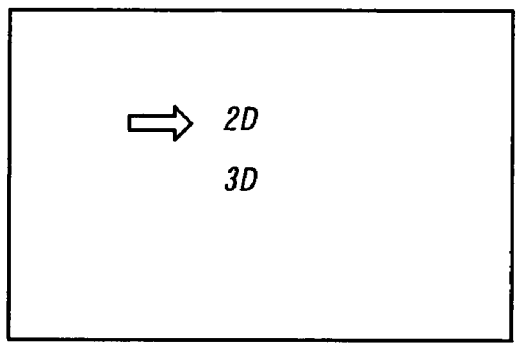
FIG. 8 is a view showing the OSD display embodiment in the first embodiment.
Figures 9A, 9B:
FIGS. 9a and 9b are views showing the OSD display embodiment in the first embodiment; similarly.

FIGS. 1-9 show the first embodiment of the present invention, FIG. 1 is a perspective view showing the head mounted type image display device and the controller from a front side, FIG. 2 is a perspective view showing the appearance in which the image displaying system of the head mounted type image display device is assembled, FIG. 3 is a partially exploded perspective view of the image displaying system shown in FIG. 2, FIG. 4 is a block diagram showing the principal portion of the main body of the device and the controller shown in FIG. 1, FIG. 5 is a block diagram showing the constitution of one embodiment of the 3D protecting processing portion shown in FIG. 4, FIG. 6 is a block diagram showing the constitution of one embodiment of the degree of influence operating portion shown in FIG. 5, FIG. 7 is a flow chart for explaining the operation of the first embodiment, and FIGS. 8 and 9 are views showing the OSD display embodiment in the first embodiment.

As shown in FIG. 1, a head mounted type image display device 1 of the present embodiment, comprises a main device body 5 of the device covering the image displaying system built therein by a front cover 5a and a rear cover 5b, joint members 6L and 6R fixed to the right and left of the main body 5 of the device, respectively, head supporting frames 7L and 7R pivotally supported so as to be able to fold these joint members 6L and 6R, right and left inner phones 9L and 9R capable of being stored respectively in an inner phone holding portion 7b of the head supporting frames 7L and 7R describe later, if necessary, an inner phone cable 9a for transmitting the aural signal to these inner phones 9L and 9R respectively, and, a sliding adjuster 8 capable of being inserted slidablly between the head supporting frames 7L, 7R and the joint members 6L and 6R. In addition, though not shown, it also provides with the nosepiece member extended telescopically from the device main body 5, and touched to user's bridge of the nose, and for supporting the main body 5 of the device together with the head supporting frame 7L and 7R.

The joint members 6L and 6R have a pivotally supported reception portion 6a to support the head supporting frames 7L and 7R rotatably, and a recess 6b inserting inner phone cable 9a at the outer side is formed.

The head supporting frames 7L and 7R comprises a pivotal supporting portion 7a for connecting it with the pivotally supported reception portion 6a of joint members 6L and 6R, the inner phone supporting portion 7b for encasing and holding inner phones 9L and 9R formed at the edge side opposite to the pivotal supporting portion 7a, if necessary, a recess 7e formed at the outer side for inserting the inner phone cable 9a therein, and an inserted position holding portion 7c and a retracted position holding portion 7d which are delimited with the rib etc. for defining a sliding adjuster 8 to the inserted position and the retracted position.

The sliding adjuster 8 comprises a holding claw 8a engaging selectively to the inserted position holding portion 7c and the retracted position holding portion 7d of the head supporting frames 7L and 7R, and a rotating angle restriction claw portion 8b inserted between the pivotally supported reception portion 6a of the joint members 6L and 6R and the pivotal supporting portion 7a of the head supporting frames 7L and 7R for restricting so as to narrow an opening angle of the head supporting frames 7L and 7R, in case of engaging the holding claw 8a to the inserted position holding portion 7c, and the sliding adjuster 8 has a rectangular hole 8c for achieving the reduction in weight partially.

The sliding adjuster 8 is fitted to the outer side detachably for the head supporting frame 7L and 7R, and has both the function for holding it at side of the head in such a manner that the inner phone cable 9a and the inner phones 9L and 9R do not hang down before one's eyes, by fitting it from the outside of an inner phone cable 9a contained along the recess 7e therein.

Moreover, a main cable 2 for transmitting the video signal and the voice signal, etc. to the head mounted type image display device 1, is extended through from the lower side of the joint member 6L as one body, and a controller 3 for controlling the image and the voice of the head mounted type image display device 1, is connected to the device body through the main cable 2.

The controller 3 is connected to the main cable 2 extended from the head mounted type image display device 1 as one body, an upper cover 31 and an under cover 32 are fitted to each other, thereby constituting an outer packaging, and in addition, and the connection cable 4 for being connected to an external device is extended therefrom. Moreover, the connection cable 4 may be constituted so as to connect it to the connector terminal provided to the controller 3 detachably.

The controller 3 is provided with an operating buttons 34 for performing display of menu, move of aimed item, modification of set value according to aimed item, and decision of set item, or the like, a power supply switch 36 (refer to FIG. 4) for turning on the power supply, and a power source lamp 35 for notifying the turn on visually with the light emitted at the turn on of the source or the like.

The operating button 34 can be operated by knocking the button down in four directions, that is, upper and down, right and left directions, from the center position at non-operation time, and in addition, the depressed operation of the button can also be performed, so that the neighborhood of the opening where operating button 34 of the outer packaging of the controller 3 is exposed, is formed as a lower step portion 31b that lowers more than an other upper surface portions 31a, and the height, to which operating button 34 is exposed and projected from the lower step portion 31b, has lowered more than the height of the upper surface portion 31a.

In addition, the operating button 34 is arranged so as to position at the lower side from the straight line that connects the corner portion on lower step portion 31b side of upper surface portion 31a and the surface of lower step portion 31b, so that regardless of the state that controller 3 is located, the operating button 34 never touches the plane where the controller 3 is left. Thus, even if the controller 3 is for example put on oblique on the desk, the operating button 34 is not carelessly compressed.

Next, the constitution of the image displaying system in head mounted type image display device 1 is explained referring to FIGS. 2 and 3.

The image displaying system is constructed in such a manner that right and left back lights 17L and 17R each consisting of white plane emission type LED unit, liquid crystal display elements (LCD) 15L and 15R as right and left image display elements for generating images corresponding to supplied video signal (refer to FIG. 4), and prisms 11L and 11R for leading luminous flux due to the image generated by these LCDs 15L and 15R and illuminated by the corresponding back lights 17L and 17R to user's right and left eyeballs, are fitted to an optical system supporting member 12, and in addition, a circuit substrate 18 for mounting a control circuit for controlling the LCDs 15L and 15R, and a control circuit for controlling back lights 17L and 17R, is fitted to the optical system supporting member 12.

The optical system supporting member 12 are fitted to a back-covering 5b in such a manner that an optical system maintenance portions 12L on the left eye side and an optical system hold portion 12R on the right eye side are connected by a connecting portion 12b, integrally, and the machine screw etc. are screwed to a fastening portion 12a provided at substantially central portion of the connecting portion 12b.

The optical system supporting member 12 is provided at its respective optical holding portions 12L and 12R with a luminous flux passing window 12d consisting of rectangular hole, respectively, a holding projection 12c is provided to right and left corner portions in its circumference, and other holding projection 12j is provided to the central portion of the arm opposed to the peripheral holding projection 12c, respectively.

Moreover, a position defining pin 12e for positioning and fixing a circuit substrate 18 is provided to two corner portions as side of the connecting portion 12b of the optical system holding portion 12R at right eye side.

In addition, the right and left ends of the optical system supporting member 12 are provided with a reception portions 12h, respectively, in which an engaging convex portions 11a of the prisms 11L and 11R are fitted, and a boss 12g are provided on the upper surface of these receiving portions 12h. The inner portion of the boss 12 are machined to engrave a screw hole of the screw.

Similarly, the shape portion having the engaging convex portion 11a of the prisms 11L and 11R fitted therein respectively is formed to the right and left ends on the undersurface side of the connecting portion 12b of the optical system supporting member 12.

The prisms 11L and 11R are constructed by a so-called free-shaped prism, in which a free-form surface capable of ensuring a high optical performance while attempting miniaturization is adopted, the prism 11 is constructed so as to eject luminous flux of the image due to corresponding LCDs 15R and 15L to the user's eyeballs after twice reflections.

The prisms 11L and 11R are provided with engaging convex portions 11a at its right and left upper end portions in the projected state, a U groove 11b is engraved to screw a machine screw there, and the engaging convex portion 11a is fitted in the reception portion 12h and the connecting portion 12b, so that the prisms 11L and 11R are fixed to the optical system supporting member 12 by fastening the machine screw to vis holes screwed on the inside of the boss 12g or the under surface side of connecting portion 12b.

On the one hand, the right and left optical system holding portions 12L and 12R of the optical system supporting member 12 comprise low-pass filters 13L, 13R for removing the unnecessary high frequency components in the frequency components contained in the luminous flux, and a rectangular hole 14a, the mask members 14L, 14R for limiting the passage of unnecessary light such as the flares, and LCDs 15L and 15R are fixed to a predetermined position, while guarding and covering the LCDs 15L and 15R, and back light holding frames 16L, 16R for fitting the back lights 17L and 17R, and back lights 17L and 17 R are fitted sequentially upward.

The low-pass filters 13L, 13R and the mask members 14L, and 14R are notched in oblique by one of its four corner portions and constituted in such a manner that these components are never mounted to in wrong direction. Moreover, the low-pass filter 13R and the mask member 14R are not shown in the figure.

Back light holding frames 16L and 16R are formed with a transparent resin etc. respectively, and comprise a light transmitting plane 16a, a tip engaging portion 16b for engaging with a holding projection 12j of the optical system supporting member 12, a pairs of right and left engaging portion 16c for engaging with a holding projection 12c of the optical system supporting member 12, a holding claw 16d for holding the corresponding back lights 17L and 17R pinched in the shape of right and left one pair, a fixed shaped portion 16e for pinching and fixing one end side of the circuit substrate 18 by an upper end plane 12f of the optical system holding portion 12R, and a fixed shaped portion 16f for pinching and fixing the other end side of the circuit substrate 18 by an upper end plane of the optical system holding portion 12L.

The back light holding frames 16L and 16R are formed by the same shaped member, and in this way, by molding the right and left with the same type, the reductions in cost is attempted, and the assembly task can be easily performed.

Also, a lower surface 17d as the emitting plane for respective back light holding frames 16L and 16R is opposed to the light transmitting plane 16a, and the corresponding back lights 17L and 17R are pinched and fixed at the right and left sides by the holding claw 16d.

The back lights 17L and 17R comprises a casing 17a of substantial taper shape, in which in case of viewing from the sides, one side is thin and the other side is thick, LED as the light source is arranged at the side of a thick back surface 17b of the casing 17a, a top surface 17c of the casing 17a (its inside) is made an inclined reflection plane for uniformizing and reflecting the light emitting from LED, and the undersurface 17d of casing 17a is made an emitting plane for emanating the uniformized light outside.

Thus, the back lights 17L and 17R are constituted by using LED as a light source, so that the low power consumption can be performed compared with the use of a fluorescent tube as the light source.

LED is (are) arranged by one or plural in parallel in the casing 17a, for example, LED constitutes as a light source for emitting light with comparatively short wavelength (blue light or the like), and the inclined reflection plane is constituted as a fluorescent scatter reflection plane, thereby converting it into uniform white light and reflecting it.

A flexible printed wiring board 19 is extended from LCDs 15L and 15R, and a plurality of leads 20 are extended from back lights 17L and 17R, after securing them once by a fixing tape 22, and then these tips are connected to a connector 19a and a lead wire connecting portion 20a mounted on the circuit board 18 respectively.

The circuit substrate 18 is constructed by a rigid substrate etc. for mounting the controlling circuit of LCDs 15L and 15R, and a controlling circuit of the back lights 17L and 17R as shown by reference numeral 21, and in addition, the inner phone cable 9a and the main cable 2 are connected thereto.

Circuit substrate 18 is a structure subjected to a downsizing as much as possible, and put on and fixed to the connecting portion 12b between the left optical system holding portion 12L and the right optical system holding portions 12R.

That is, a hole 18a fitting on the position defining pin 12e respectively, and a rectangular hole 18b are punched on two corner portions as the sides of the optical system holding portion 12R of the circuit substrate 18, and the positioning is performed by inserting these pins in these holes.

In addition, the circuit substrate 18 is fixed to the optical system supporting member 12 by putting it between the upper end plane 12f and the fixed shaped portion 16e at the side of the optical system holding portion 12R, and by putting it between the upper end plane and fixed shaped portion 16f at the side of the optical system holding portion 12L.

The above image displaying system is covered with the front cover 5a and the rear cover 5b, and contained in the device body 5.

In this case, the electrical charging prevention film (not shown) is mounted to the further outside portion of the back lights 17L and 17R. As a result, an inner circuit can be guarded by preventing static electricity from the outside.

Moreover, the ocular window (not shown) is formed in rear cover 5b, the transparent plate (not shown) is fitted to, and the image emanated from the prisms 11L and 11R is observed through the ocular window.

In addition, the front cover 5a has gradual sloping shape toward forward, and the back lights 17L and 17R with the above tapered shape as described above are arranged according to the above sloping shape, in such a manner that the thinner side is made forward, and the thicker side (side to which LED is arranged) is made the rear side (that is, ocular side).

Next, the circuit structure of the principal portion of the head mounted type image display device according to the present embodiment is explained with reference to FIG. 4.

The controller 3 comprises a YC separation circuit 40, a decoder 41, an analog to digital conversion circuit 42, a synchronous separation circuit 43, a 3D protecting processing portion 44, an external memory 45, an operating button 34, a microcomputer 47, a voice preamplifier 48, a voice main amplifier 49, a power unit 51, and a power supply switch 36. Moreover, the device body 5 comprises the controlling circuit 21, right and left LCDs 15L, 15R, and right and left inner phones 9L and 9R as described above.

An analog composite video signal including right and left video signals capable of displaying 3D image output alternately in a field sequential manner from an external device, is supplied to an YC separation circuit 40 in the controller 3 to separates to a luminance signal Y and a chrominance signal C, in addition, converted into an analog RGB video signal in a decoder 41 and supplied to a controlling circuit 21 of the device body 5, and supplied supplies to the right and left LCDs 15L and 15R from the controlling circuit 21.

Right and left LCDs 15L and 15R are driven and controlled, based on the instruction from the microcomputer 47 of the controller 3 by the controlling circuit 21. For example, in a 3D observation mode, right and left LCDs 15L and 15R are alternately driven in synchronizing with the field, as a result, the video signal of the even field is, for example, displayed on LCD 15L for the left eye, the video signal of the odd field is, for example, displayed to LCD15R for the right eye, and these right and left images are fused in the viewer, thereby observing the 3D image.

Moreover, in two dimensional image (2D) observation mode, right and left LCDs 15L and 15R are driven at the same time, and the same video signals of both fields are displayed on the right and left LCDs 15L and 15R.

Moreover, the selection of 3D or 2D observation mode is displayed by supplying OSD (On Screen Display) signal of the screen for 3D·2D selection to the right and left LCDs 15L and 15R from a microcomputer 47 by a required operation of an operating button 34 through a controlling circuit 21, and is performed by operating the operating button 34 on the OSD screen.

Moreover, the right and left voice signals supplied by an external device and the composite video signals are amplified with a voice preamplifier 48 of the controller 3, and are amplified with a voice main amplifier 49, to output from right and left inner phones 9L and 9R of the device body 5.

On the other hand, the luminance signal Y separated with a YC separation circuit 40, is converted into the digital signal by an analog to digital conversion circuit 42 and is supplied to a 3D protecting processing portion 44 in the controller 3. Moreover, the luminance signal Y is supplied to a synchronous separation circuit 43, wherein vertical synchronizing signals are separated from the luminance signal Y and field synchronizing signals are generated, the field synchronizing signals are supplied to a 3D protecting processing portion 44. Moreover, the controller 3 has S terminal, the luminance signal Y input to the S terminal is supplied to a decoder 41, an analog to digital (A/D) conversion circuit 42, and a synchronous separation circuit 43, and the chrominance signal C is supplied to the decoder 41.

As shown in FIG. 5, a 3D protect processing portion 44 comprises a memory control portion 61, a degree of influence operation portion 62, and a degree of influence decision portion 63. In the 3D protect processing portion 44, sequential field digital video signals from an analog to digital conversion circuit 42 are written in an external memory 45 through a memory control portion 61, in synchronizing with the field synchronizing signal from a synchronous separation circuit 43, by plural fields (here, by four sequential fields) while updating them one by one. And the video signals of two fields (ODD field and next EVEN field) written in the external memory 45 sequentially are similarly read in synchronizing with the field synchronizing signal through a memory control portion 61, the parallax value in the horizontal and vertical direction, etc. is detected by for example well-known block matching method in a degree of influence operating portion 62 based on the read video signal in sequential field, the degree of influence given to the viewer is operated based on the parallax value detected one by one, whether or not the degree of influence reached the reference value is decided by a degree of influence deciding portion 63, and the decision result is output to a microcomputer 47.

The degree of influence operating portion 62 comprises a preprocessing portion 65, a parallax measuring portion 66, an evaluating portion 67, an error code setting portion 68, and an evaluation value accumulating portion 69 as shown in FIG. 6 and the evaluating portion 67 has a static parallax evaluating portion 67-1 and a dynamic parallax evaluating portion 67-2.

The sequential field video signals read from the external memory 45 by the memory control portion 61 are supplied to the preprocessing portion 65, and herein the images of sequential two fields are stored in the memory of the preprocessing portion 65 respectively according to the prescribed timing and the preprocessing of the resolution conversion and smoothing, etc. are performed.

In parallax measuring portion 66, the parallax value included in the stereoscopic image from the preprocessed image is measured to calculate the parallax statistics. Herein, the parallax value of statistics is to mean the statistical data such as the minimum value and the mode value etc. of the parallax value included in the stereoscopic image.

In evaluating portion 67, the parallax value of statistics is converted into the evaluation value, based on the previously set rule. This rule is defined in consideration of person's visual characteristic. Static evaluation of parallax value is performed by the static parallax evaluating portion 67-1 of the evaluating portions 67 and thus the evaluation value is set according to the value of the parallax value of statistics. A large evaluation value is set if there is a big parallax in the image. On the one side, the dynamic evaluation of the parallax value is performed by the dynamic parallax evaluating portion 67-2, and thus the evaluation value is set according to the time change of the parallax value of statistics.

Here, the precision of the parallax measurement is not obtained enough according to the character of input 3D image, there is a case that the reliability of the calculated parallax value of statistics is low. Therefore, the error status is recorded by an error code setting portion 68, and in case of setting the evaluation value, the evaluation value is changed if necessary referring to an error code setting portion 68.

In evaluation value accumulating portion 69, the evaluation values obtained by the evaluating portion 67 are integrated, and added to the previous accumulated value, thus accumulated value is supplied to the degree of influence deciding portion 63 as a degree of influence, whether or not the thus obtained degree of influence reached the reference value is decided by the degree of influence deciding portion 63, the decided result is supplied to the micro-computer 47, and the displaying operation of the right and left LCDs 15L and 15R according to the controlling circuit 21 is controlled by microcomputer 47 based on the decided result in the degree of influence deciding portion 63.

Moreover, the required power supply is supplied to respective portions of the controller 3 and the device body 5 from the power supply portion 51 installed in the controller 3 under the switching on of the power supply switch 36.

Hereafter, the operation of the image display device according to the present embodiment is explained with reference to a flow chart shown in FIG. 7, and a display embodiment of OSD shown in FIGS. 8 and 9.

First, if the power supply switch 36 is turned on (step S1), the microcomputer 47 OSD-displays the selecting screen for selecting the 2D or 3D observation mode as shown in FIG. 8 on the right and left LCDs 15L and 15R through the controlling circuit 21, and the cursor is moved to select 2D or 3D (step S2) under operation of the operating button 34 according to the viewer on the selecting screen.

In the case of selecting 2D observation mode in step S2, as described above, the right and left LCDs 15L and 15R are driven at the same time in step S3 by a usual routine, and the same video signal of both fields is displayed on the right and left LCDs 15L and 15R.

On the contrary, in the case of selecting 3D observation mode in step S2, the input of the 3D image signal to the 3D protecting processing portion 44 begins (step S4), the parallax value in the horizontal and the vertical directions, etc. is detected by the block matching method in the degree of influence operating portion 62 as to all blocks at every block (step S5), the evaluation value is operated based on the parallax value (step S6), in the case of detecting the completion of the parallax detection for all blocks and the completion of measurement of the parallax evaluation in step S7, the evaluation values of all blocks are integrated and added to the previous accumulated value, (step S8), thus accumulated value is supplied to the degree of influence deciding portion 63 as a degree of influence, and whether or not the thus obtained degree of influence reached the reference value is decided (step S9).

If the degree of influence does not reach the reference value in step S9, the operation returns to step S8, and the parallax evaluation value in the next sequential field is accumulated, and in the case that the degree of influence reached the reference value, at that time, the warning screen, for example, as shown in FIG. 9(*a*) is OSD-displayed on the right and left LCDs 15L, 15R by the microcomputer 47 through controlling circuit 21 in step S10, afterwards, for example, the notification screen as shown in FIG. 9(*b*) is OSD-displayed, and then, the power supply switch 36 is automatically turned off and the observation of the 3D image is discontinued compulsorily.

Thus, according to the first embodiment of the present invention, in the 3D observation mode, the parallax value is detected in the 3D protecting processing portion 44 to accumulate its evaluation value, and thus the warning screen is displayed in OSD and when the accumulated level (degree of influence) reaches the reference value, the warning is announced to the viewer, and then the power supply switch 36 is automatically turned off, so that the influence on the viewer according to the 3D image observation can surely be decreased.

SECOND EMBODIMENT

FIGS. 10(a), (b) and (c) are views explaining the second embodiment of the present invention and showing respective OSD display embodiments.

According to the present embodiment, in the constitution similar to the first embodiment, in the case that the degree of influence reached the reference value, at the time of image observation in 3D observation mode, the warning screen, for example, as shown in FIG. 10(a), is OSD-displayed on the right and left LCDs 15L, 15R by the microcomputer 47 through the controlling circuit 21, the image observation is selected as it is by operating "Continue" or "Do not continue" by the operating button 34 due to the viewer, in the case of selecting "Continue", for example, the notification screen as shown in FIG. 10(b) is OSD-displayed, the observation is compulsorily switched to the 2D observation mode and the observation of the image is continued by a usual routine, in the case of selecting "Do not continue" for example, the notification screen as shown in FIG. 10(c) is OSD-displayed, and then the power supply switch 36 is automatically turned off and the observation of the 3D image is discontinued compulsorily.

In this way, in addition that the influence on the viewer due to the 3D image observation can surely be decreased as well as the first embodiment, in the case of selecting "Continue" of the image observation, the observation is automatically switched to 2D observation mode, so that the viewer can observe the image to the last minute.

THIRD EMBODIMENT

By the way, in the conventional head mounted type image display device, in general, use to less than 16 years old is prohibited, there is a case to register the password. Such an image display device becomes only for personal, in case of registering the password, and after reaching the reference value by the degree of influence in 3D observation mode according to the person, there are any unaffected people, too, even if the 3D image is continuously observed.

Then, in a third embodiment of the present invention, the registration of the password is enabled, though the observation of the image is possible even if the password is not registered, in case of using the device, if the password having already been registered is input, even after reaching the reference value by the degree of influence in the 3D observation mode, and the observation of the 3D image is continuously enabled.

FIG. 11 is a block diagram showing the circuit configuration of the principal portion of the third embodiment. In the head mounted type image display device, in the constitution shown in FIG. 4, a password memory 71, in which the password is stored by connecting the microcomputer 47 thereto, is installed, and other constitutions are the same as ones shown in FIG. 4, so that the same reference number is attached to the same component as one shown in FIG. 4 and the explanation thereof is omitted.

In this embodiment, user's password of the device is previously input and stored in the password memory 71 by depressing the operating button 34, and the display of the image to the right and left LCDs 15L and 15R is controlled through the controlling circuit 21 by the microcomputer 47, according to whether or not the password is set at the using of the device was used, that is, whether or not the password is input, or in the case of inputting the password, whether or not the input password is registered in the password memory 71.

Figure 12:
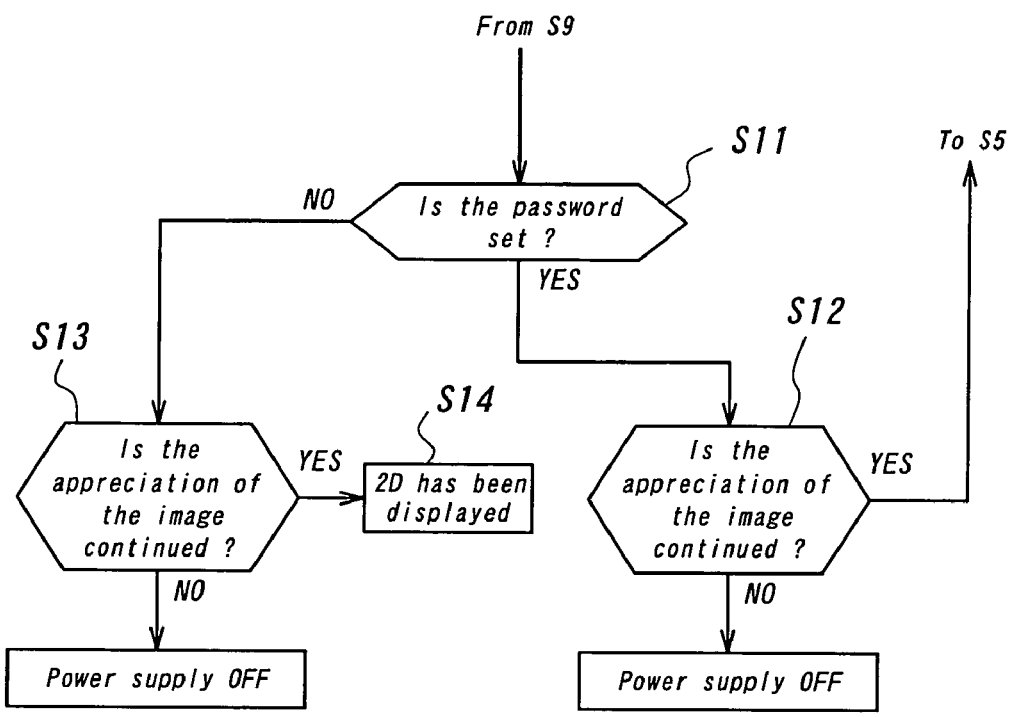
FIG. 12 is a flow chart for explaining the operation of the principal portion in the third embodiment.

That is, in 3D observation mode, if the degree of influence is decided reaching to the reference value in step S9 shown in FIG. 7, then, as shown by the flow chart in FIG. 12, it is decided whether the password is set with the microcomputer 47 (step S11).

Figure 13A:
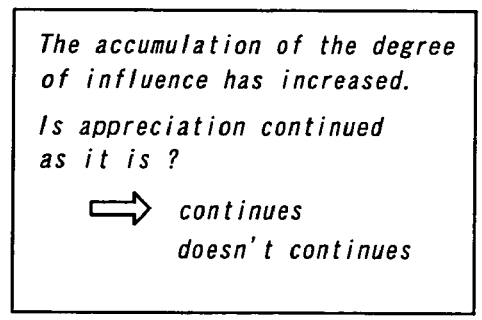
FIGS. 13a to 13c are views showing the OSD display embodiment in the third embodiment.
Figure 13B:
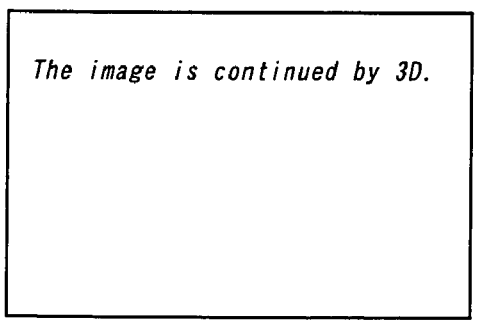

Here, in the case of deciding that the password is set, that is, in case of confirming that the password is set at the using of the device, and the input password and the password registered in password memory 71 are coincided with each other by the microcomputer 47, the warning screen shown in FIG. 13(a) is OSD-displayed on the right and left LCDs 15L and 15R, for example, through the controlling circuit 21, in the viewer, "Continue" as it is or "Do not continue" of the 3D image observation is selected by depressing of the operating button 34 (step S12),and then in the case of selecting "Continue" for example, the notification screen shown in FIG. 13(b) is OSD-displayed, and returns to the step S5 shown in FIG. 7, the image displaying of the 3D is continued as it is.

Moreover, in this case, when the warning screen shown in FIG. 13(a) is displayed once, the warning screen is not displayed thereafter, for example, in the viewer, the 3D observation mode is continued until the power supply switch 36 is turned off, or at the time of returning the step S5 in FIG. 7 from the step S12 of FIG. 12, the degree of influence that accumulated till then is reset, and the operating of the degree of influence is started newly, and every time the degree of influence reaches the reference value, the warning screen shown in FIG. 13(a) is displayed and then whether or not the 3D observation mode is continued, is selected.

Figure 13C:
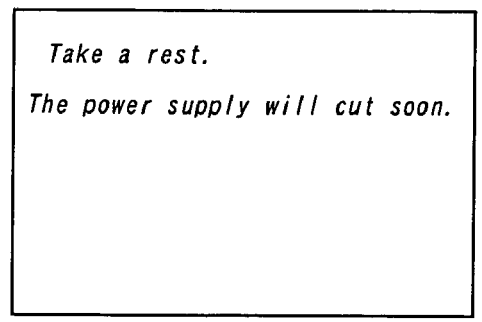

On the contrary, in the step S12, in case of selecting "Do not continue" on the warning screen shown in FIG. 13(a), the notification screen shown in FIG. 13(c) is OSD-displayed, and the power supply switch 36 is automatically turned off and the observation of the 3D image is discontinued.

On the one hand, in the step S11 shown in FIG. 12, in case of deciding the password not to be set, that is, in the case that the password is not input at the using of the device, and in case of confirming that even if the password is input, the input password is not registered in password memory 71 by the microcomputer 47, for example, the warning screen shown in FIG. 10(a) is OSD-displayed, and in the viewer, "Continue" as it is or "Do not continue" of the image observation is selected (step S13), in case of selecting the selection of "Continue", for example, the notification screen as shown in FIG. 10(b) is OSD-displayed, and the 2D observation mode is switched compulsorily, and the observation of the image is continued (step S14) by a usual routine, in case of selecting the selection of "Do not continue", for example, the notification screen as shown in FIG. 10(c) is OSD-displayed, and the power supply switch 36 is automatically turned off and the observation of the 3D image is discontinued compulsorily.

According to the present embodiment, the password is registered previously, the registered password is input at the use of the device, and thus the image source of 3D can be observed to the last minute in the 3D observation mode, so that the satisfied image observation can be attained.

Moreover, in the third embodiment of the present invention, even though the password is not registered, the image observation is enabled, however, the password is registered, in the case that the registered password is not input at the use of the device, the image can not be observed. In this case, the step S11 shown in FIG. 12 is omitted, the step S12 is executed at the time of reaching the degree of influence to the reference value, or the 3D image can be observed, by setting the device in such a manner that neither the operating nor the alarm display of the degree of influence are performed.

FOURTH EMBODIMENT

Figure 14:
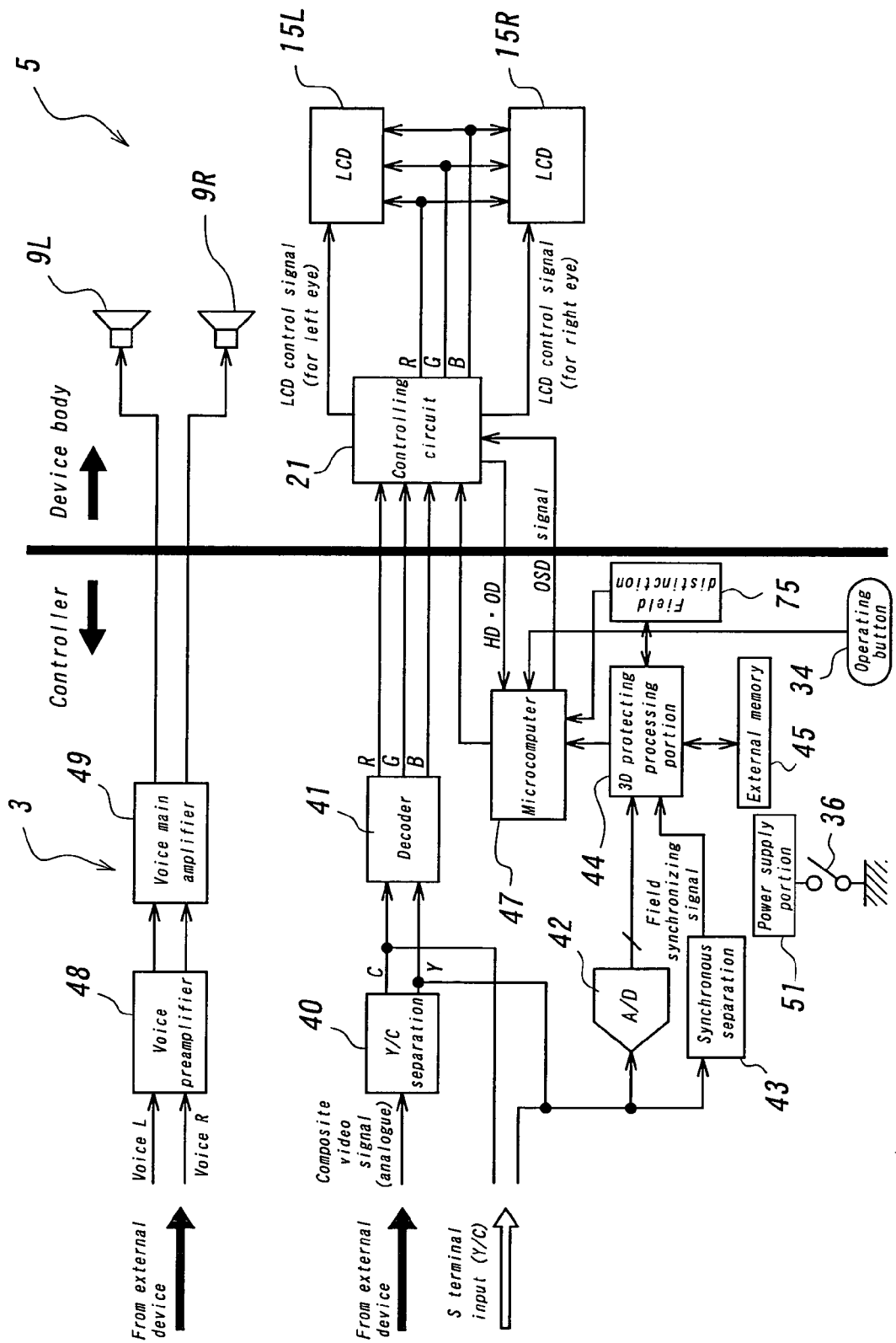
FIG. 14 is a block diagram showing the circuit structure of the principal portion in the fourth embodiment of the present invention.

FIG. 14 is a block diagram showing the circuit structure of the principal portion in the fourth embodiment of the present invention. The head mounted type image display device comprises, in the constitution shown in FIG. 4, a field distinction portion 75 for distinguishing the field of the right and left video signals based on the parallax value detected by 3D protecting processing portion 44 at 3D observation mode, the controlling circuit 21 is controlled by the microcomputer 47 in accordance with to the distinction result in the field distinction portion 75, the left video signal is supplied to the left LCD 15L and the right video signal is supplied to the right LCD 15R respectively, and thus other constitutions are the same as ones shown in FIG. 4, so that the same reference number is attached to the same component as one shown in FIG. 4 and the explanation thereof is omitted.

That is, as described above, the field sequential 3D video signal is defined by EIAJ, however, in the domestic and foreign current 3D image softwares, the software that signal on L side is arranged in the even field, and signal on R side is arranged in the odd field, and on the contrary, the software that the signal on R side is arranged in the even field, and the signal on L side is arranged in the odd field, exist together, so that for example, in the case that the video signal of the even field is displayed to LCD 15L on L side fixedly, and the video signal of the odd field is displayed to LCD 15R on R side fixedly, when the provided 3D software has the even field being a video signal on R side, and the odd field being a video signal on L side, the degree of influence to the viewer is made more stronger, and the 3D image can not be appreciated, or the like, thereby generating the inconvenience.

Then, in this embodiment, the field of the right and left video signals is distinguished by the field distinction portion 75, based on the parallax value detected by the degree of influence operating portion 62 (refer to FIG. 6) of the 3D protecting processing portion 44, and the controlling circuit 21 is controlled by the microcomputer 47, in such a manner that according to the distinction result, the Left LCD 15L is driven during the field period, in which a left video signal is supplied, and the right LCD 15R is driven during the field period, in which a right video signal is supplied, and thus the left video signal is supplied to the left LCD 15L, and the right video signal is supplied to the right LCD 15R respectively.

Herein, the field distinction based on the parallax value in the field distinction portion 75 is distinguished overall according to three characteristics of the followings 1), 2), and 3).

Figure 15A:
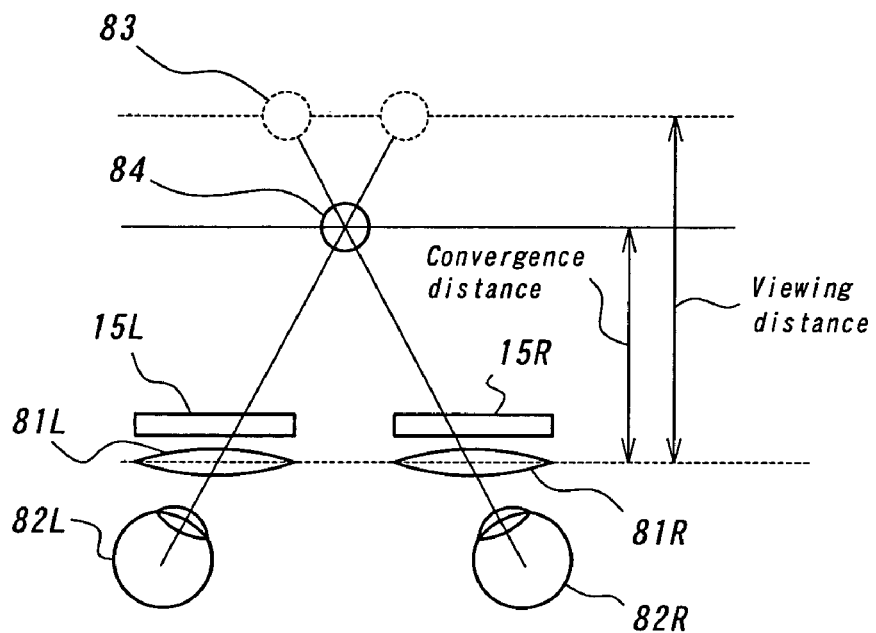
FIGS. 15a and 15b is are views for explaining the fourth embodiment.
Figure 15B:
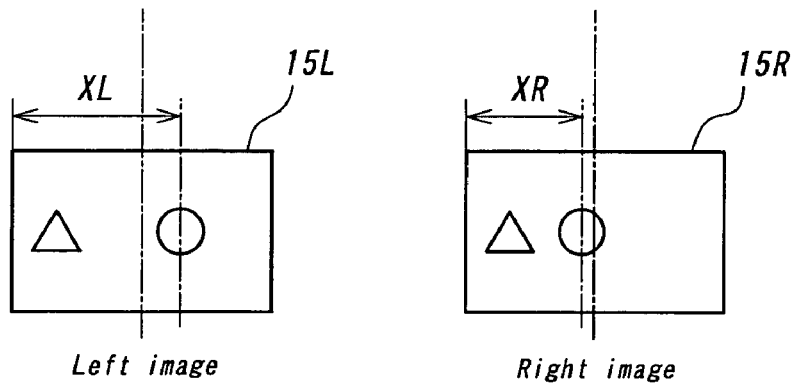

1) There is an opposite possibility if there are a lot of too large parallaxes in the one polarity. This point is explained with reference to FIGS. 15(a) and 15(b) as well as FIG. 16. FIGS. 15(a) and 15 (b) are views for explaining the parallax value in the 3D video signal, FIG. 15(a) shows the observation mode of the 3D image in which the spherical body dashes out, and, FIG. 15(b) shows the image displayed on the right and left LCDs 15L and 15R in that case. In FIG. 15(b), Δ mark shows the image in the infinity, ◯ mark shows the 3D displayed spherical body (dashing out display), XL shows a horizontal position of the spherical body of L(left) image, XR shows a horizontal position of the spherical body of R (right) image, and these positions XL and XR are not equal and are shifted to rightist inclinations or the left from the center.

As shown in FIG. 15(a), when the images shown in FIG. 15(b) are displayed on the right and left LCDs 15L and 15R, respectively, and are observed through right and left lenses 81L and 81R on the right and left eyeballs 82L and 82R, the spherical body is displayed onto a virtual image position 83 where the focus of right and left eyeballs 82L and 82R is suitably matched, and two images displayed on the virtual image position 83 are fused and observed on a fusional position 84 as one image. Herein, the distance from the position of the right and left lenses 81L and 81R to the fusional position 84 is called as a convergence distance, the distance from the position of the right and left lenses 81L and 81R to the virtual image position 83 is called as a viewing distance, the horizontal parallax value is represented by the difference of the horizontal position of the right and left images, for instance, by (XL-XR), and the parallax value corresponds to the convergence distance, and thus it means that when the parallax value is large, the dashing out degree to this side is large.

Figure 16:
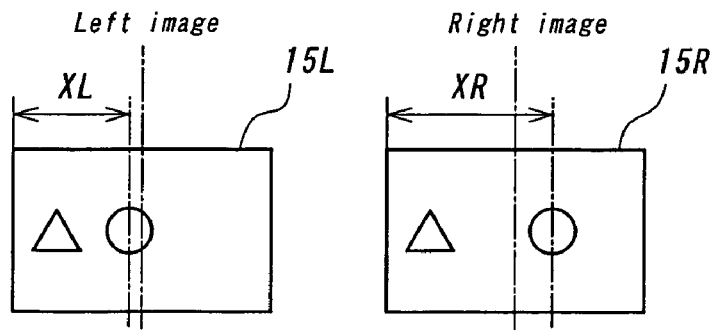
FIG. 16 is a view for explaining the fourth embodiment, similarly.

However, as shown in FIG. 16, when the image at R side is displayed on LCD 15L at L side and the image at L side is displayed on LCD15R at R side, XR of the image displayed on LCD 15R at R side becomes large, and the spherical body is deviated to the right side from the center of the screen, and thus the parallax value becomes minus, i.e., negative.

In this way, when a lot of images included in the 3D image are in the above relation, it is determined that the right and left images are displayed oppositely. Moreover, in the above embodiment, the horizontal parallax value is detected from (XL-XR), so that in the case that the right and left images are in opposite, the horizontal parallax value becomes larger to the minus side, but in the case that the horizontal parallax value is detected from (XR-XL), the horizontal parallax value becomes larger to the plus side, oppositely.

2) In the upper half and the lower half of the screen, in generally, the parallax of the lower half is larger.

Figure 17:
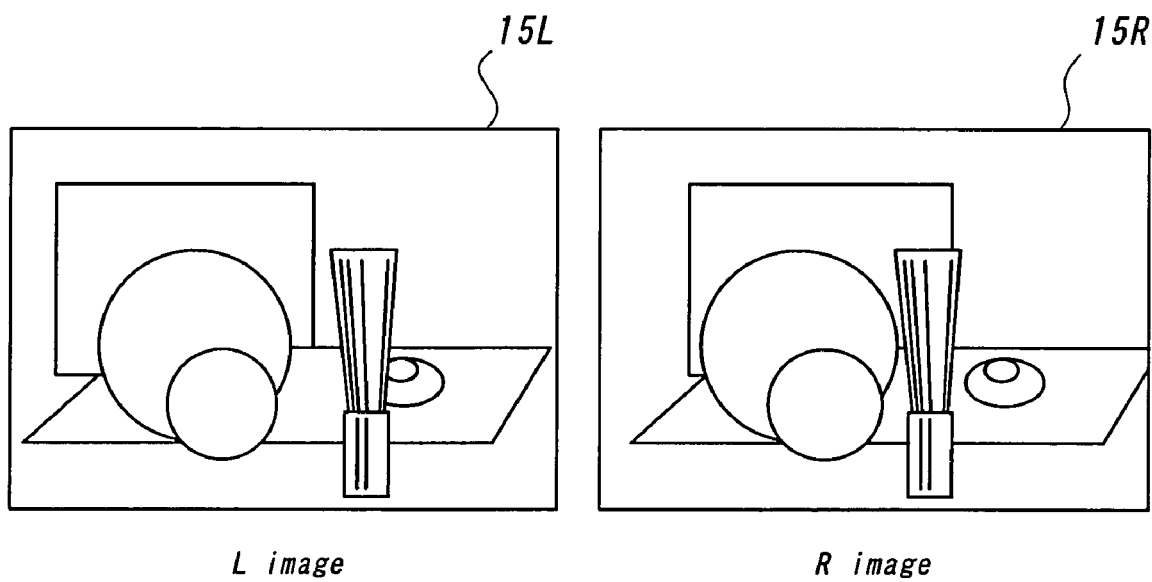
FIG. 17 is a view for explaining the fourth embodiment, similarly.

In the case of usual scenery, it is abundant that the lower side of the screen is a near view, and the upper side is a distant view, as shown in FIG. 17, in the image, of which the object on the table look down at the oblique, near side will come below.

Figure 18A:
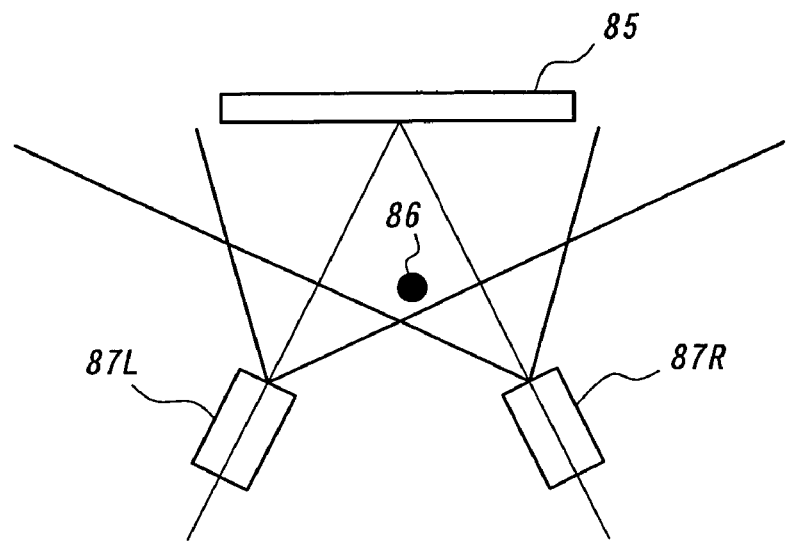
FIGS. 18a and 18b are views for explaining the fourth embodiment, similarly.
Figure 18B:
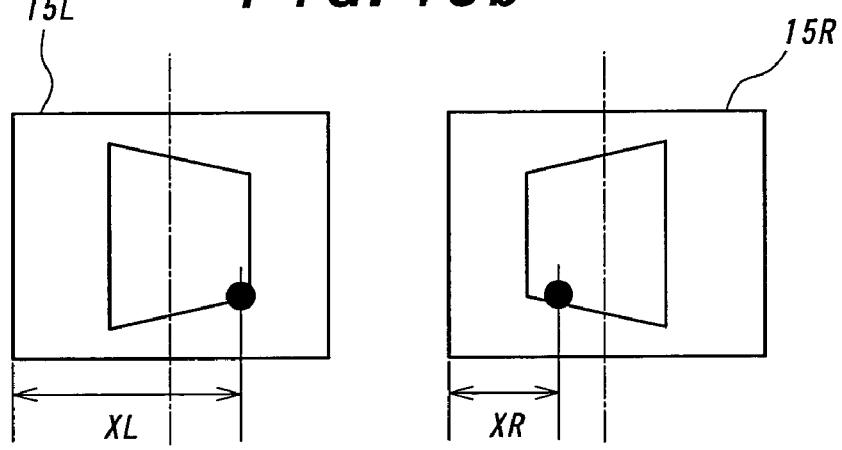
Figure 19:
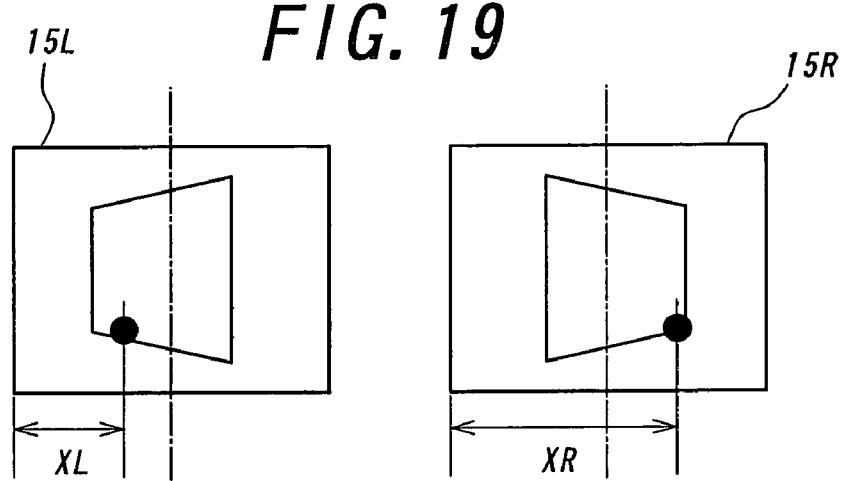
FIG. 19 is a view for explaining the fourth embodiment, similarly.

On considering this point, for example, as shown in FIG. 18(a), when a spherical body 86 positioned near a wall 85 is looked down upon and imaged by right and left cameras 87L and 87R, the right and left images become as shown in FIG. 18(b), and when this is displayed on the right and left LCDs 15L and 15R, oppositely, the image becomes as shown in FIG. 19, so that the phenomenon similar to the case of the 1) causes. Therefore, in the lower half of the screen, when the parallax is larger in the opposite direction, it is decided that the right and left images are displayed, oppositely.

3) In the case that the vertical parallax has been generated on the screen end, the right image shifts upper in case of the upper right end, and the right image shifts lower in case of the lower right end.

Figure 20A:
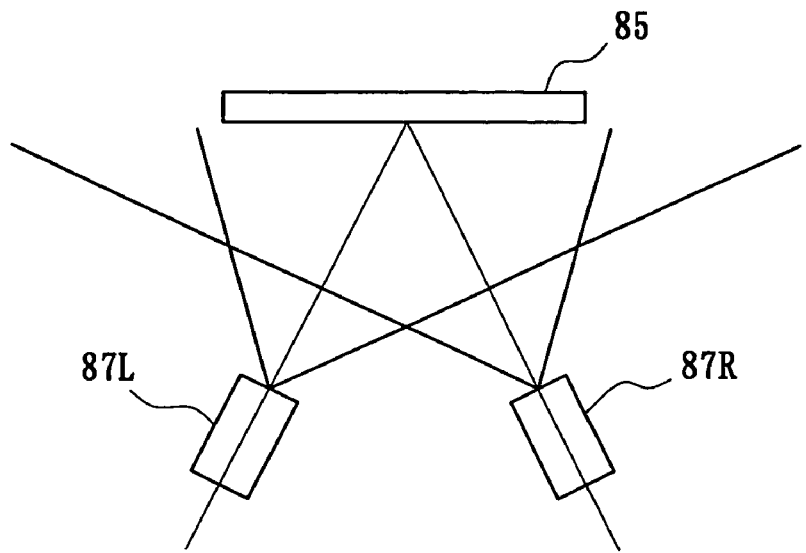
FIG. 20a and 20b are views for explaining the fourth embodiment, similarly.
Figure 20B:
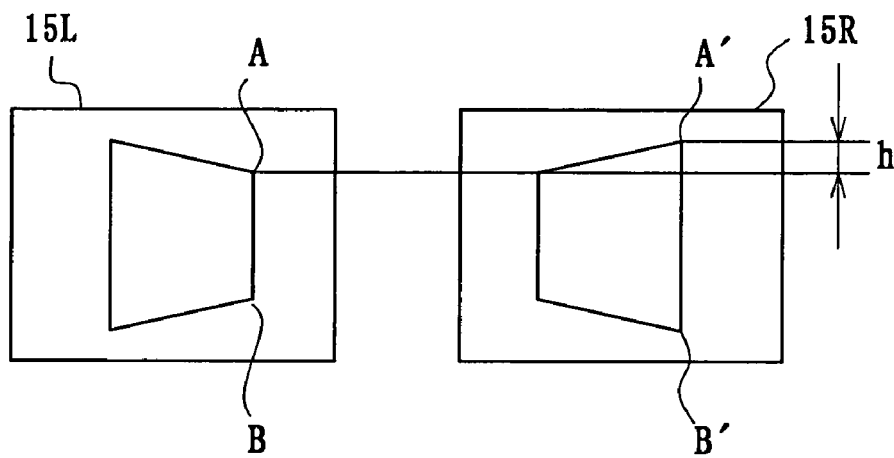

That is, as shown in FIG. 20(a), when the wall 85 is imaged by the right and left cameras 87L and 87R, the right and left images become as shown in FIG. 20(b). Herein, on paying attention to the upper right edges A and A' of the wall displayed on the right and left screens, the position of the upper right edge A' of the right image shifts on h more than the position of the upper right end A of the left image, and thus when the lower right edges B and B' are paid to attention, the position of the lower right edge B' of the right image shifts below than the position of the lower right end B of the left image.

Figure 21:
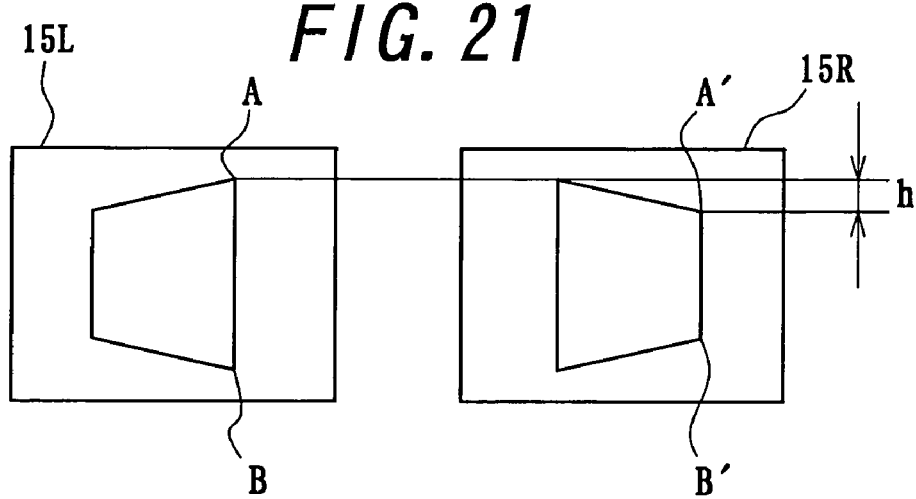
FIG. 21 is a view for explaining the fourth embodiment, similarly.

On the contrary, as shown in FIG. 21, when the image shown in FIG. 20(b) is displayed on the right and left LCDs 15L and 15R, oppositely, the above relation becomes reversal. Therefore, in the case that such a vertical parallax has been generated, it is decided that the right and left images are displayed oppositely.

In the field distinction portion 75, the field of the right and left video signals is distinguished from the above three characteristics, based on the parallax value detected by the 3D protecting processing portion 44, when the image signals are displayed on the right and left LCDs 15L and 15R, oppositely, the drive of the right and left LCDs 15L and 15R according to the controlling circuit 21 is switched through the microcomputer 47, in such a manner that the left video signal is correctly displayed on the left LCD 15L, and the right video signal is correctly displayed on the right LCD 15R respectively, and the order of reading the field sequential video signal from the external memory 45 is switched, oppositely, according to memory control portion 61(Refer to FIG. 5) of 3D protecting processing portion 44.

The effect of displaying the during field distinction of "During detection" etc. is OSD-displays in a blue backing or a black backing, etc, without displaying the video signal from an external device on the right and left LCDs 15L and 15R, during the period of the field according to the field distinction portion 75, the 3D image is displayed by controlling the controlling circuit 21 with the microcomputer 47, in such a manner that, after completion of the distinction, as described above, the left video signal is correctly displayed on the left LCD 15L, and the right video signal is correctly displayed on the right LCD 15R. Thereafter, as in the same as the first embodiment, when the degree of influence based on the parallax value reaches the reference value, the warning screen is OSD-displayed, thereby automatically turning off the power supply switch 36.

In this way, in this embodiment, the control is performed in such a manner that the field of the right and left video signals is distinguished by the field distinction portion 75, based on the parallax value detected by the 3D protecting processing portion 44 at 3D observation mode, and the left video signal is correctly displayed on the left LCD 15L, and the right video signal is correctly displayed on the right LCD 15R, so that the 3D image can regularly be appreciated without being influenced on the order of the right and left video signals of the provided 3D image software.

Moreover, fourth embodiments of the can be combined with the second embodiment or a third embodiment.

FIFTH EMBODIMENT

Figure 22:
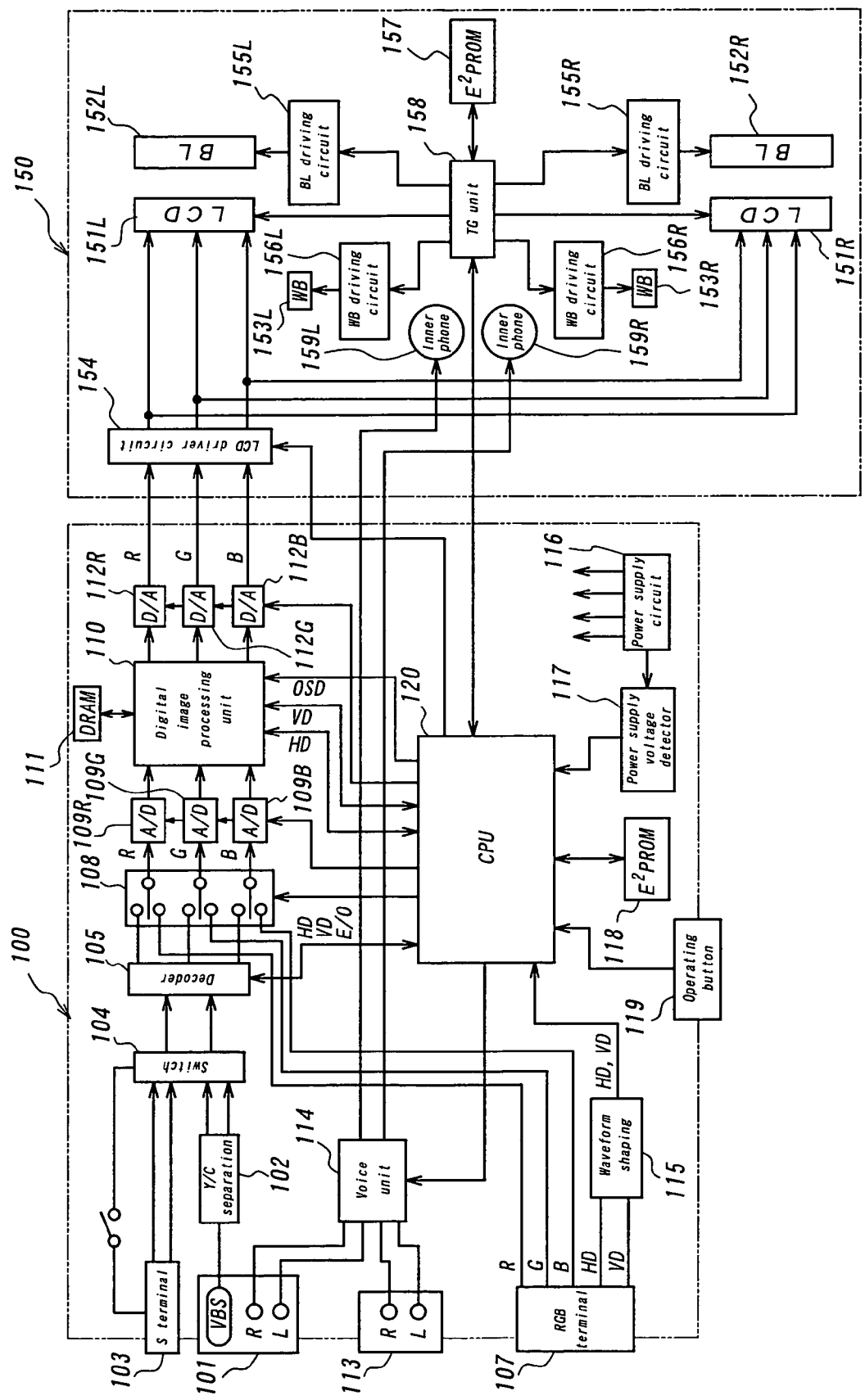
FIG. 22 is a block diagram showing the circuit structure of the principal portion in the fifth embodiment of the present invention.

FIG. 22 is a block diagram showing the circuit structure of the principal portion in the fifth embodiment of the present invention. In the present embodiment, in the first-fourth respective embodiments, the point of providing the function of the 3D protecting processing portion 44 for the digital image-processing unit is different fundamentally.

In FIG. 22, a controller 300 comprises a YC separation circuit 402 for separating the composite video signals VBS input from an A/V input terminal 101 into a luminance signal Y and a chrominance signal C; a switch 104 for selecting and outputting the signal from the terminal connected according to whether or not the connection is performed to either of an A/V input terminal 101 or an S image input terminal 103; a decoder 105 for converting the luminance signal Y and the chrominance signal C from the switch 104 into the signals of the respective colors of red (R), green (G), and blue (B) signal, and for extracting the vertical synchronizing signal VD, the horizontal synchronizing signal HD and the field signal E/O; an exchanging switch 108 for switching the RGB signals output from the decoder 105 and the PC video signal of RGB input from an external device such as computers to an RGB input terminal 107; A/D converters 109R, 109G, and 109B for sampling RGB signal from the exchanging switch 108 by usual twice sampling frequency, and for converting the sampled signals into digital signals, respectively; a digital image processing unit 110 for performing a 3D protect processing explained by the above embodiment, based on the video signal digitalized by these A/D converters 109R, 109G, and 109B, and for performing the digital image processing and the mask processing of image, in which the video signal is LCD-displayed corresponding to the pixel shift of four point shift (Wobbling); a DRAM 111 as a working memory of the digital image processing unit 110; DACs 112R, 112G, and 112B for converting the digital red, green, and blue signals output from the digital image processing unit 110 into analog signal, respectively; a voice unit 114 for exchanging the speech signal input from the A/V input terminal 101 and the speech signal input from the voice input terminal 113 and for adjusting the volume and tone quality according to its interchanging, a waveform shaping circuit 115 for wave-shaping the vertical synchronizing signal VD and the horizontal synchronizing signal HD input from the RGB input terminal 107; a power circuit 116 for supplying the required power supply voltage to each portion of the controller 300 and each portion of a device body 150; a power supply voltage detector 117 for detecting the power supply voltage of the power circuit 116; an $E^2$PROM 118; an operating button 119 having a power supply button, a menu button, and a selection button, etc; and a CPU 120 for controlling the operations of respective portions, based on the vertical synchronizing signal VD, the horizontal synchronizing signal HD and the field signal E/O from the decoder 105, the vertical synchronizing signal VD and the horizontal synchronizing signal HD from the waveform shaping circuit 115, the detecting voltage from the power supply voltage detector 117, the memory contents of the E2PROM 118, and the depressing of the operating button 119 etc.

Here, $E^2$PROM 118 memorizes various set values and initial value relating to the image/voice etc. in relation to the image source, and the adjusted value arbitrarily set by the user in relation to the image source. In the present embodiment, as an image source, five kinds in total of image sources of four kinds of video signals of respective composite video signals and S video signals of NTSC system and PAL system being AV mode, and the PC video signal from an external device such as computers being PC mode, are made selectable, and these respective video signals have been independently adjusted concerning the image, for example as to respective video signals of AV mode, respective items of the contrast, the bright, the density of color, hue, sharpness, white balances red, white balances blue, are adjustable, or as to the PC video signal of PC mode, respective items of the contrast and bright are adjustable. Moreover, for the voice signal, for example, respective items of the volume, the bus, the treble, the balance, and the surround, etc. are adjustable, independently, in the AV mode and PC mode. Moreover, the reference value of the degree of influence in the 3D observation mode is also set and changed properly and stored in the E2PROM 118 in the viewer.

Moreover, a device body 150 comprises an LCD driver circuit 154 for driving LCDs 151L and 151R by the analog RGB signal from the controller 300, right and left back light (BL) driving circuits 155L and 155R for driving back lights 152L and 152R, right and left Wobbling element (WB) driving circuits 156L and 156R for driving Wobbling elements 153L and 153R, an E²PROM 157, a timing generator (TG) unit 158 for controlling the operations such as LCDs 151L, 151R, the back light driving circuits 155L, 155R, and Wobbling element driving circuits 156L and 156R based on the memory content of the E²PROM 157 and the signal from the CPU 120 of the controller 300, etc. right and left inner phones 159L, 159R, in addition to the right and left LCDs 151L and 151R, the right and left back lights (BL) 152L and 152R, and the right and left Wobbling elements (WB) 153L and 153R.

Here, every respective back light driving circuits 155L and 155R, the control data corresponding to the power supply voltage for driving the corresponding back lights 152L and 152R by the substantial same given lighting brightness, for example, offset data of the initial data when power supply voltage is in reference voltage, are stored previously in the E2PROM 157.

In the present embodiment, the AV mode and PC mode are switched and selected by the OSD (on screen display) according to the depression of the operating button 119, and thus the AV input or the PC input is selected by the exchanging switch 108 with the switch of the OSD. Moreover, when the S image input terminal 103 is connected, the switch 104 performs the switching operation so as to make S display priority.

Moreover, the image according to the image source is set by CPU 120, and the input video signal are imaged and displayed on the right and left LCDs 151L and 151R in the decoder 105, the digital image processing unit 110 and the LCD driver circuit 154 according to the image setting, and thus the voice is set according to the AV mode or PC mode, and the input voice signals are voice-processed in the voice unit 114 according to the voice setting, thereby outputting the voice from the right and left inner phones 159L and 159R.

That is, in the voice setting, the image source is identified and the adjusted value of the corresponding image source is read from the E2PROM 118, and the read respective adjusted value is written in the corresponding circuit portions, for example, in the decoder 105, the digital image processing units 110, the LCD driver circuit 154 and the timing generator unit 158. As a result, the input video signals are processed according to the set respective adjusted value, and displayed on the right and left LCDs 151L and 151R. Moreover, when the image source is a PC video signal, the processing by the decoder 105 is not performed.

Moreover, in the voice setting, the image source is identified and the adjusted value of the corresponding mode is read from the E2PROM 118 according to the AV mode or PC mode, the read respective adjusted value is written in the voice unit 114, as a result, the input voice signals are processed according to the set respective adjusted value, and output from the right and left inner phones 159L and 159R.

In this way, various set values and initial values concerning the image/voice etc. are memorized in the E²PROM 118 in relation to the image source, and the adjusted value set by the user arbitrarily, is memorized, the slight difference of the images every image source can be set respectively as data by processing the input image/voice signal according to the data of the corresponding image source memorized in the E²PROM 118, based on the input image source, and thus the input image/voice signal can be automatically processed without requiring the calling operation. Therefore, even if the image source is changed, the image can be observed at any time without performing any operation under the desired state, and thus the convenience can be improved.

Moreover, the 3D protecting processing by the digital image processing unit 110 is similar to the above first, second, third or fourth embodiments, so that the explanation thereof is omitted here.

Possibility on Industrial Utility

According to the present invention, the parallax value of the right and left video signals supplied to the right and left image display elements by the 3D protecting process means is detected at 3D observation mode, the degree of influence given to the viewer based on the detected parallax value, is operated, whether or not the operating degree of influence reaches the reference value, is decided, when it is decided that the degree of influence reached the reference value, the decision is displayed selectively on the right and left image display elements by the display control means, so that the degree of influence to the viewer of the 3D image can be decreased, and thus the image can be observed always appropriately.

What is claimed is:

1. An image display device for displaying images by either of a two-dimensional image or a three-dimensional image comprising:

right and left image display elements which receive respective right and left image signals, which when viewed concurrently, provide a stereoscopic image to a user;

three-dimensional protecting process means which detects a parallax value for each of the right and left image signals supplied to the right and left image display elements, and an evaluation value as a degree of influence given to the viewer is determined for each of the signals, by calculating a parallax statistic which is statistical data of the parallax value included in the stereoscopic image based upon the detected parallax value, performing both static evaluation and dynamic evaluation of the parallax value based on the parallax statistics to determine the respective evaluation values, and then integrating both of the evaluation values, the determined evaluation value for each of the signals is an accumulated value, the accumulated value being calculated by sequentially adding the evaluation value, and a determination is made as to whether the accumulated value is at least equal to a predetermined threshold value;

a display control means that selectively displays whether the accumulated value is at least equal to the predetermined threshold value on the right and left image display elements;

a password input means for selectively inputting a password of a viewer;

a password storage means for storing the password provided by the password input means; and a password decision means for deciding whether the password from the password input means is stored in the password storage means, and when it is determined that the password is stored, even if it is determined that the evaluation value is at least equal to the predetermined threshold value, without displaying the decision on the right and left image display elements, the display control means displays the three-dimensional image on the right and left image display elements, and when it is determined that the password is not stored even if it is determined that the evaluation value is at least equal to the predetermined threshold value, the display control means displays the two-dimensional image on the right and left image display elements, wherein when the evaluation value is at least equal to the predetermined threshold value, the display control means selectively displays whether or not the image together with the displaying are continuously observed, on the right and left image display elements.

2. An image display device for displaying images by either of a two-dimensional image or a three-dimensional image comprising:

right and left image display elements which receive respective right and left image signals, which when viewed concurrently, provide a stereoscopic image to a user;

three-dimensional protecting process means which detects a parallax value for each of the right and left image signals supplied to the right and left image display elements, and an evaluation value as a degree of influence given to the viewer is determined for each of the signals, by calculating a parallax statistic which is statistical data of the parallax value included in the stereoscopic image based upon the detected parallax value, performing both static evaluation and dynamic evaluation of the parallax value based on the parallax statistics to determine the respective evaluation values, and then integrating both of the evaluation values, the determined evaluation value for each of the signals is an accumulated value, the accumulated value being calculated by sequentially adding the evaluation value, and a determination is made as to whether the accumulated value is at least equal to a predetermined threshold value;

a display control means that selectively displays whether the accumulated value is at least equal to the predetermined threshold value on the right and left image display elements;

a password input means fox selectively inputting a password of a viewer;

a password storage means for storing the password provided by the password input means; and a password decision means for deciding whether the password from the password input means is stored in the password storage means, and when it is determined that the password is stored, even if it is determined that the evaluation value is at least equal to the predetermined threshold value, without displaying the decision on the right and left image display elements, the display control means displays the three-dimensional image on the right and left image display elements, and when it is determined that the password is not stored even if it is determined that the evaluation value is at least equal to the predetermined threshold value, the display control means displays the two-dimensional image on the right and left image display elements, wherein the display control means supplies a video signal of an odd number field or of an even number field to the right and left image display elements, thereby two-dimensionally displaying the image in the case of selecting that the image is continuously observed, and the display control means turns off the main power supply in the case where the image is not continuously observed.

3. An image display device for displaying images by either of a two-dimensional image or a three-dimensional image comprising:

right and left image display elements which receive respective right and left image signals, which when viewed concurrently, provide a stereoscopic image to a user;

three-dimensional protecting process means which detects a parallax value for each of the right and left image signals supplied to the right and left image display elements, and an evaluation value as a degree of influence given to the viewer is determined for each of the signals, by calculating a parallax statistic which is statistical data of the parallax value included in the stereoscopic image based upon the detected parallax value, performing both static evaluation and dynamic evaluation of the parallax value based on the parallax statistics to determine the respective evaluation values, and then integrating both of the evaluation values, the determined evaluation value for each of the signals is an accumulated value, the accumulated value being calculated by sequentially adding the evaluation value, and a determination is made as to whether the accumulated value is at least equal to a predetermined threshold value;

a display control means that selectively displays whether the accumulated value is at least equal to the predetermined threshold value on the right and left image display elements:

a password input means for selectively inputting a password of a viewer;

a password storage means for storing the password provided by the password input means;

a password decision means for deciding whether the password from the password input means is stored in the password storage means, and when it is determined that the password is stored, even if it is determined that the evaluation value is at least equal to the predetermined threshold value, without displaying the decision on the right and left image display elements, the display control means displays the three-dimensional image on the right and left image display elements, and when it is determined that the password is not stored even if it is determined that the evaluation value is at least equal to the predetermined threshold value, the display control means displays the two-dimensional image on the right and left image display elements; and a field distinction means for determining a field of a right and left video signal based on the parallax value detected by the 3D protecting process means, and the display control means supplies a left video signal to a left image displaying element and a right video signal to a right image displaying element, according to a result of the field distinction means.

4. An image display device as claimed in claim 3, wherein during the determination by the field distinction means, the display control means prohibits the display of the three-dimensional image on the right and left image display elements, and displays the duration of the determination period of the field on the right and left image display elements.

* * * * *